United States Patent
Gaurav et al.

(10) Patent No.: US 9,672,068 B2
(45) Date of Patent: Jun. 6, 2017

(54) VIRTUAL MACHINE SCHEDULING USING OPTIMUM POWER-CONSUMPTION PROFILE

(71) Applicant: VMWARE, INC., Palo Alto, CA (US)

(72) Inventors: Kumar Gaurav, Bangalore (IN); Hemanth Kumar Pannem, Bangalore (IN); Bhaskardas Kambivelu, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 87 days.

(21) Appl. No.: 14/554,075

(22) Filed: Nov. 26, 2014

(65) Prior Publication Data
US 2016/0103711 A1 Apr. 14, 2016

(30) Foreign Application Priority Data
Oct. 9, 2014 (IN) .......................... 5085/CHE/2014

(51) Int. Cl.
*G06F 9/48* (2006.01)
*G06F 1/32* (2006.01)

(52) U.S. Cl.
CPC ............ *G06F 9/4893* (2013.01); *G06F 1/329* (2013.01); *Y02B 60/10* (2013.01); *Y02B 60/144* (2013.01)

(58) Field of Classification Search
CPC ..... G06F 9/4893; G06F 1/329; Y02B 60/144; Y02B 60/10
See application file for complete search history.

(56) References Cited

U.S. PATENT DOCUMENTS

| | | | | |
|---|---|---|---|---|
| 8,374,928 B2* | 2/2013 | Gopisetty | .............. | G06Q 10/06 705/30 |
| 8,423,998 B2* | 4/2013 | Isci | ....................... | G06F 9/5077 717/176 |
| 8,645,733 B2* | 2/2014 | Kansal | .................. | G06F 1/3203 713/300 |
| 8,655,610 B2* | 2/2014 | Dasgupta | ................ | G06F 17/50 702/61 |
| 8,886,361 B1* | 11/2014 | Harmon | ................. | G06Q 10/04 700/291 |
| 8,996,890 B2* | 3/2015 | Cox | ....................... | G06F 1/3203 713/300 |
| 9,037,880 B2* | 5/2015 | Doddavula | ........... | G06F 1/3206 713/300 |
| 9,235,441 B2* | 1/2016 | Brech | .................... | G06F 9/4893 |
| 9,317,319 B2* | 4/2016 | Cao | ..................... | G06F 9/45558 |
| 9,465,635 B2* | 10/2016 | Holler | ................ | G06F 9/45533 |
| 9,471,350 B2* | 10/2016 | Pavlas | ................. | G06F 9/45558 |
| 2002/0143482 A1* | 10/2002 | Karanam | ............. | G01R 21/133 702/62 |
| 2006/0259621 A1* | 11/2006 | Ranganathan | .......... | G06F 1/206 709/226 |
| 2009/0292654 A1* | 11/2009 | Katiyar | ................. | G06Q 30/04 705/412 |

(Continued)

*Primary Examiner* — Benjamin Wu

(57) ABSTRACT

Methods and systems of determining an optimum power-consumption profile for virtual machines running in a data center are disclosed. In one aspect, a power-consumption profile of a virtual machine and a unit-rate profile of electrical power cost over a period are received. The methods determine an optimum power-consumption profile based on the power-consumption profile and the unit-rate profile. The optimum power-consumption profile may be used reschedule the virtual machine over the period.

18 Claims, 25 Drawing Sheets

(56) References Cited

U.S. PATENT DOCUMENTS

| | | | | |
|---|---|---|---|---|
| 2012/0016528 A1* | 1/2012 | Raman | ............... | G06F 9/5094 700/291 |
| 2012/0290862 A1* | 11/2012 | Brown | ............... | G06F 1/329 713/320 |
| 2013/0030593 A1* | 1/2013 | Gao | ............... | G06F 1/26 700/297 |
| 2013/0179895 A1* | 7/2013 | Calder | ............... | G06F 9/5077 718/104 |
| 2014/0215076 A1* | 7/2014 | Grothues | ............... | G06F 9/455 709/226 |
| 2014/0316973 A1* | 10/2014 | Steven | ............... | G06Q 50/06 705/37 |
| 2014/0324532 A1* | 10/2014 | Ghosh | ............... | G06Q 30/0206 705/7.31 |
| 2014/0344808 A1* | 11/2014 | Banerjee | ............... | G06Q 30/04 718/1 |
| 2015/0046221 A1* | 2/2015 | Narayan | ............... | G06Q 10/06 705/7.31 |
| 2015/0128131 A1* | 5/2015 | Cao | ............... | G06F 9/45533 718/1 |
| 2015/0242226 A1* | 8/2015 | Palavalli | ............... | G06F 9/45558 718/1 |
| 2016/0124411 A1* | 5/2016 | Tinnakornsrisuphap | ............... | G05B 19/0428 700/291 |
| 2016/0127184 A1* | 5/2016 | Bursell | ............... | G06F 15/177 709/221 |

\* cited by examiner $U = \{U_0, U_1, U_2, U_3, U_4, U_5\} = \{5,8,4,6,2,1\}$ —— 1710

$U_{sort} = \{U_5, U_4, U_2, U_0, U_3, U_1\} = \{1,2,4,5,6,8\}$ —— 1902

$W = (20+10+60+30+70+50)\Delta t = 240\Delta t$ —— 2002 initialize optimum power-consumption set $P'_0 = P'_1 = P'_2 = P'_3 = P'_4 = P'_5 = P_{min} = 10$ $P' = \{P'_0=10, P'_1=10, P'_2=10, P'_3=10, P'_4=10, P'_5=10\}$ —— 2004 form ordered power-consumption set with index j $\{P''_j\} = \{P''_0=10, P''_1=20, P''_2=30, P''_3=50, P''_4=60, P''_5=70\}$ —— 2006

FIG. 20 for k = 0

$e = 240\Delta t - (10+10+10+10+10+10)\Delta t = 180\Delta t$ —— 2101

$P_{max} = \max\{20,10,60,30,70,50\} = 70$ —— 2102

$S[k=0] = 5 = j$ —— 2103 read $P''_5 = 70$ from $\{P''_j\}$ —— 2104

$incr = \min(e/\Delta t, P_{max} - P''_j) = \min(180, 70-70) = 0$ —— 2105

$P'_5 = P''_5 + incr = 70 + 0 = 70$ —— 2106

$e \neq 0 \rightarrow$ continue to next iteration —— 2107

$P = P - P_{max} = \{20,10,60,30,50\}$ —— 2108 increment k —— 2109

FIG. 21A for k = 1

$e = 240\Delta t - (10+10+10+10+10+70)\Delta t = 120\Delta t$ $P_{max} = \max\{20,10,60,30,50\} = 60$ $S[k=1] = 4 = j$ read $P''_4 = 60$ from $\{P''_j\}$ incr $= \min(e/\Delta t, P_{max} - P''_j) = \min(120, 60 - 60) = 0$ $P'_4 = P''_4 + $ incr $= 60 + 0 = 60$ ⟵ 2110

$e \neq 0 \rightarrow$ continue to next iteration $P = P - P_{max} = \{20,10,30,50\}$ increment k

FIG. 21B for k = 2

$e = 240\Delta t - (10+10+10+10+60+70)\Delta t = 70\Delta t$ $P_{max} = \max\{20,10,30,50\} = 50$ $S[k=2] = 2 = j$ read $P''_2 = 30$ from $\{P''_j\}$ incr $= \min(e/\Delta t, P_{max} - P''_j) = \min(70, 50 - 30) = 20$ $P'_2 = P''_2 + $ incr $= 30 + 20 = 50$ ⟵ 2111

$e \neq 0 \rightarrow$ continue to next iteration $P = P - P_{max} = \{20,10,30\}$ increment k

FIG. 21C for k = 3

$e = 240\Delta t - (10+10+50+10+60+70)\Delta t = 30\Delta t$ $P_{max} = \max\{20,10,30\} = 30$ $S[k=3] = 0 = j$ read $P''_0 = 10$ from $\{P''_j\}$ $incr = \min(e/\Delta t, P_{max} - P''_j) = \min(30, 30 - 10) = 20$ $P'_0 = P''_0 + incr = 10 + 20 = 30$ ⟵ 2112

$e \neq 0 \rightarrow$ continue to next iteration $P = P - P_{max} = \{20,10\}$ increment k

FIG. 21D for k = 4

$e = 240\Delta t - (30+10+50+10+60+70)\Delta t = 10\Delta t$ $P_{max} = \max\{20,10\} = 20$ $S[k=4] = 3 = j$ read $P''_3 = 50$ from $\{P''_j\}$ $incr = \min(e/\Delta t, P_{max} - P''_j) = \min(30, 20 - 50) = -30$ $P'_3 = P''_3 + incr = 50 - 30 = 20$ ⟵ 2113

$e \neq 0 \rightarrow$ continue to next iteration $P = P - P_{max} = \{10\}$ increment k

FIG. 21E for k = 5

$e = 240\Delta t - (30+10+50+20+60+70)\Delta t = 0\Delta t = 0$ $S[k=5] = 1 = j$ read $P''_1 = 20$ from $\{P''_j\}$ incr $= \min(e/\Delta t, P_{max} - P''_j) = \min(0, 20 - 20) = 0$ $P'_1 = P''_1 +$ incr $= 20 - 0 = 20$ ⟵ 2114

$e = 0 \rightarrow$ STOP

FIG. 21F

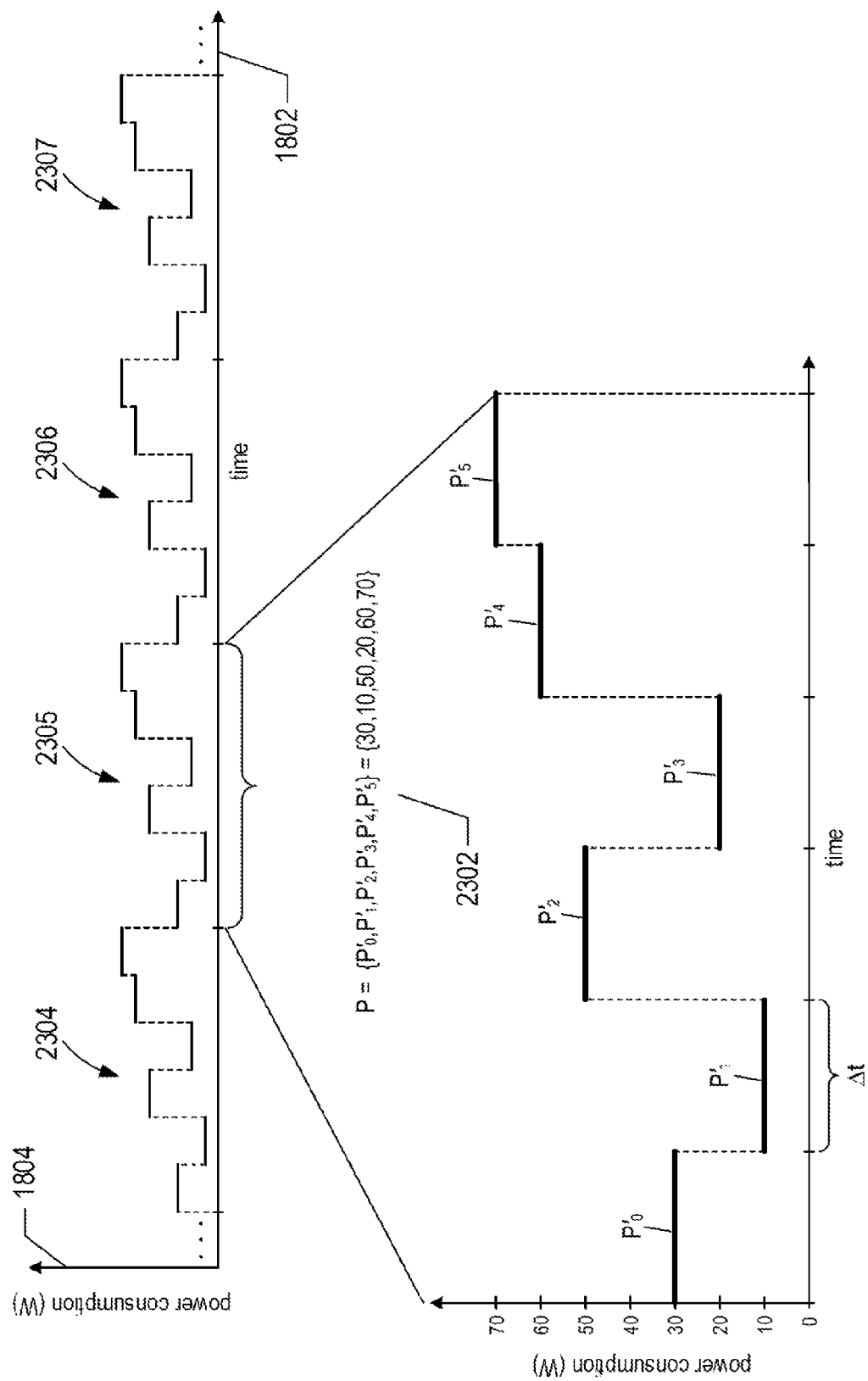

VIRTUAL MACHINE SCHEDULING USING OPTIMUM POWER-CONSUMPTION PROFILE

TECHNICAL FIELD

The present disclosure is directed to data centers, and, in particular, to computational systems and methods to optimize data-center power consumption.

BACKGROUND

Nearly all online activity, including email, internet use, social media, and conducting business, is delivered by way of millions of data centers around the world, ranging from small closet-sized data centers with a single rack of servers up to extremely large data centers with thousands of rack mounted servers, routers, telecommunications, and mass-storage devices. This explosive growth in data center dependence results in large amounts of energy usage. For example, a typical rack of servers may use a few kilowatts of electricity while numerous racks of servers housed in a large data center may use on the order of hundreds of megawatts of electricity over the same period of time not to mention the electricity used by other devices and support resources. Large data centers, in particular, may use more than 100 times the electricity of that used by a typical office building. As a result, electrical power consumption is among the primary costs of operating a data center. For very large data centers, power costs may account for well over 10% of the total operating cost of the data center with the cost continuing to rise with increasing server size. Data-center operators, owners and customers continue to seek ways to reduce data center power consumption and thereby lower operating costs.

SUMMARY

This disclosure is directed to computational systems and methods of optimizing data center power consumption. In one implementation, the systems and methods monitor virtual machine ("VM") utilization of a data center over time in order to identify those VMs that are running periodically scheduled workloads. The systems and methods target these VMs for power consumption optimization by generating an optimum power-consumption profile for the VMs based on periodic electrical power unit rate costs. The VMs may then be scheduled to operate in accordance with the optimum power-consumption profile and contribute to a reduction in data center operating costs.

DESCRIPTION OF THE DRAWINGS

FIG. 19 shows unit rates of a unit-rate set sorted into an ordered unit-rate set.

FIG. 20 shows a power-consumption set and corresponding total workload of virtual machine power-consumption profile.

FIGS. 21A-21F show computation of an optimum power-consumption profile.

FIG. 23 shows an example plot of a periodic optimum power-consumption profile for a virtual machine.

DETAILED DESCRIPTION

Figure 1:
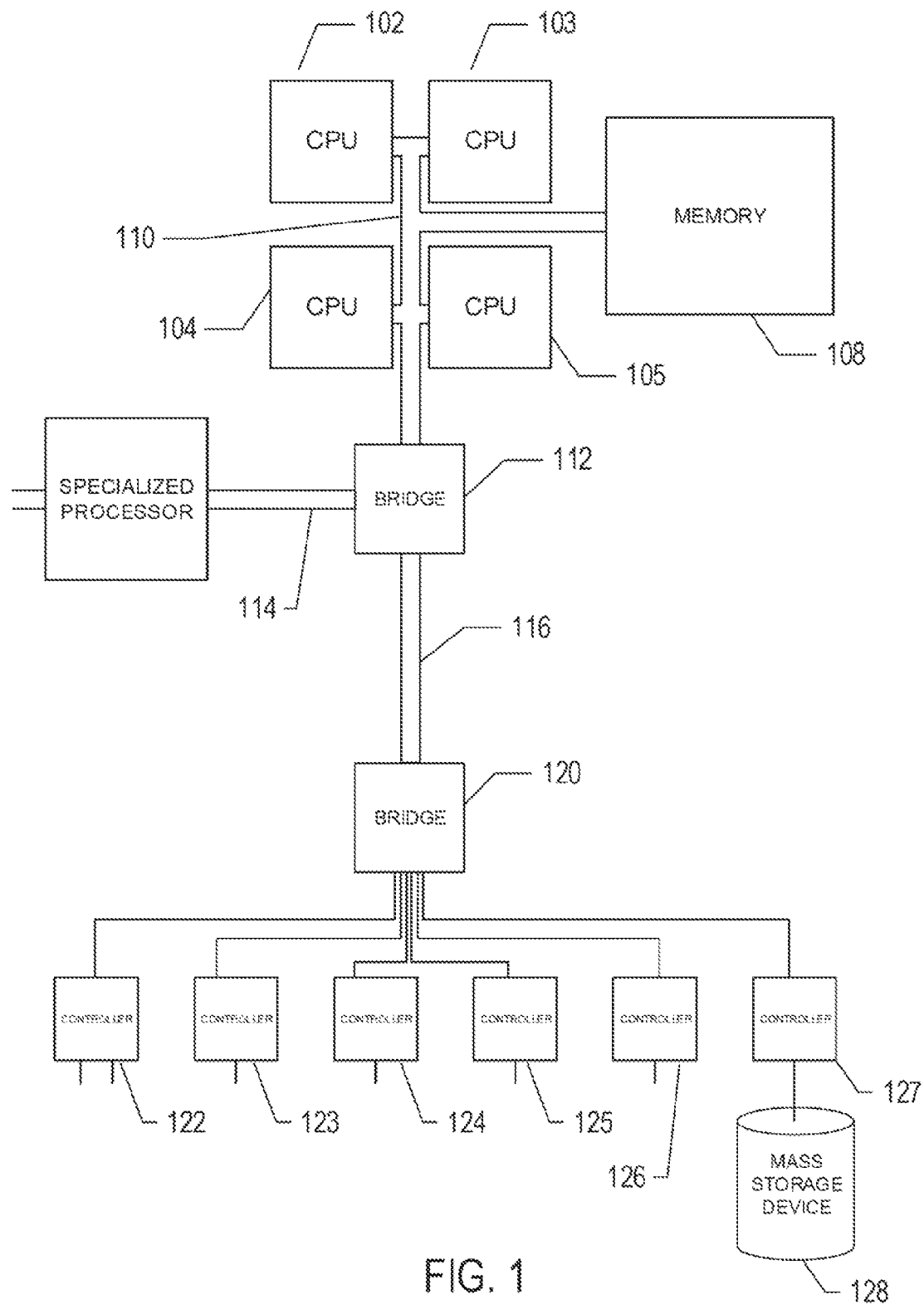
FIG. 1 shows a general architectural diagram for various types of computers.

The disclosure is directed to methods and systems that determine optimum power-consumption profiles for virtual machines ("VMs") over a period of time. In a first subsection, below, a detailed description of computer hardware, complex computational systems, and virtualization are discussed with reference to FIGS. 1-10. In a second subsection, implementations of the currently disclosed methods and systems that determine optimum power-consumption profiles of VMs are discussed with reference to FIGS. 11-24.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and VMs, communications interfaces, and many of the other topics discussed below are tangible, physical components of physical, electro-optical-mechanical computer systems.

FIG. 1 provides a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
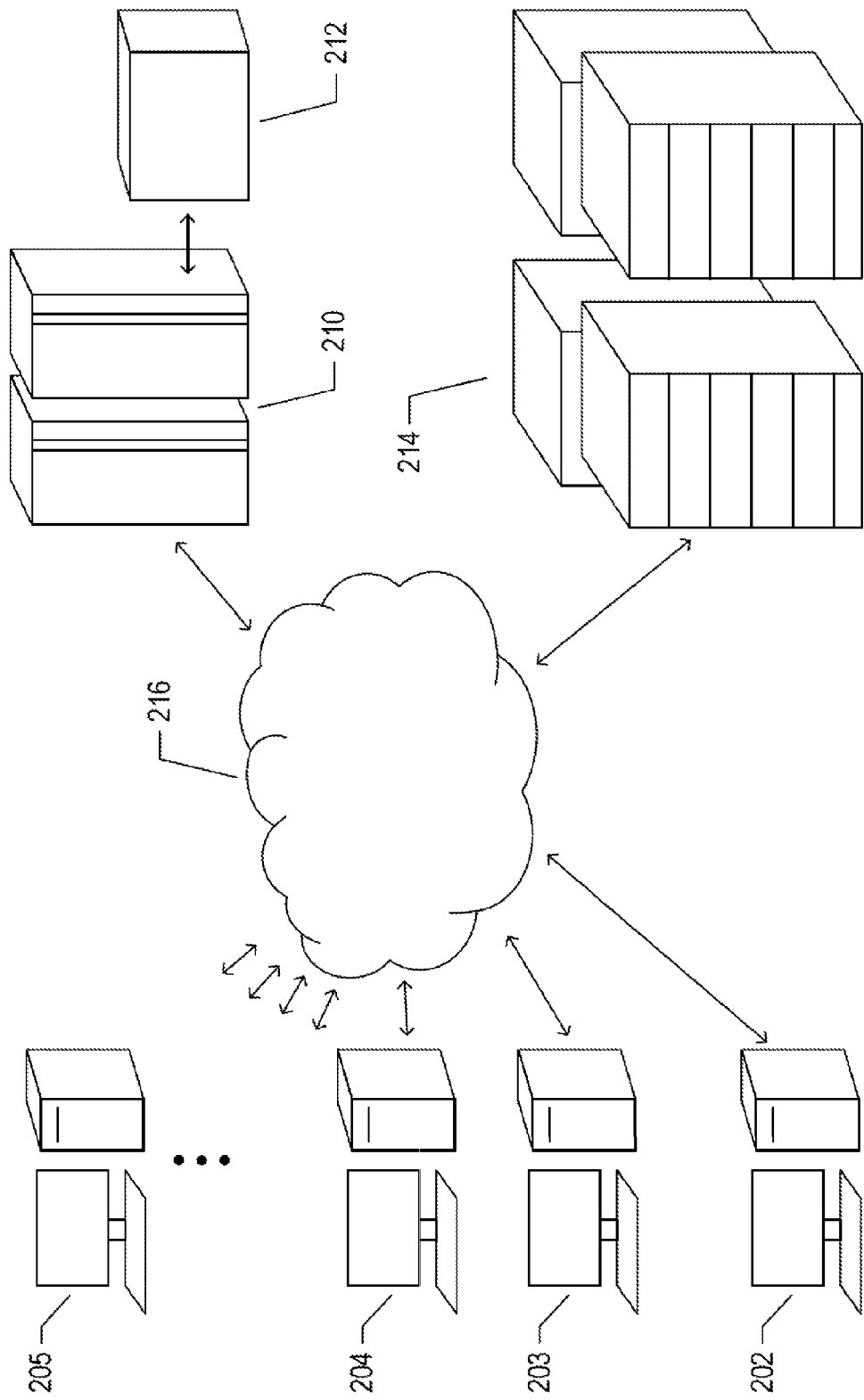
FIG. 2 shows an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
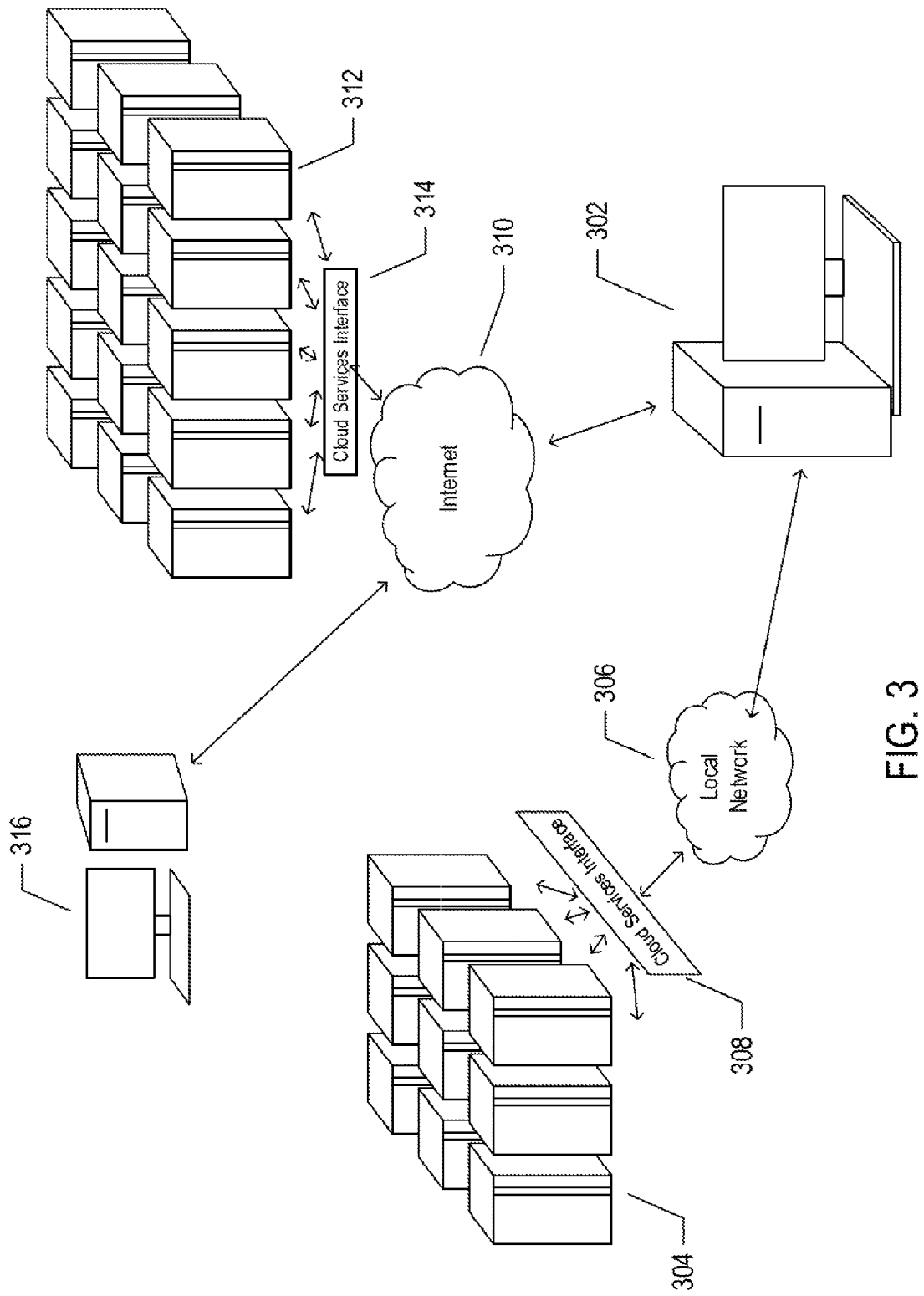
FIG. 3 shows cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
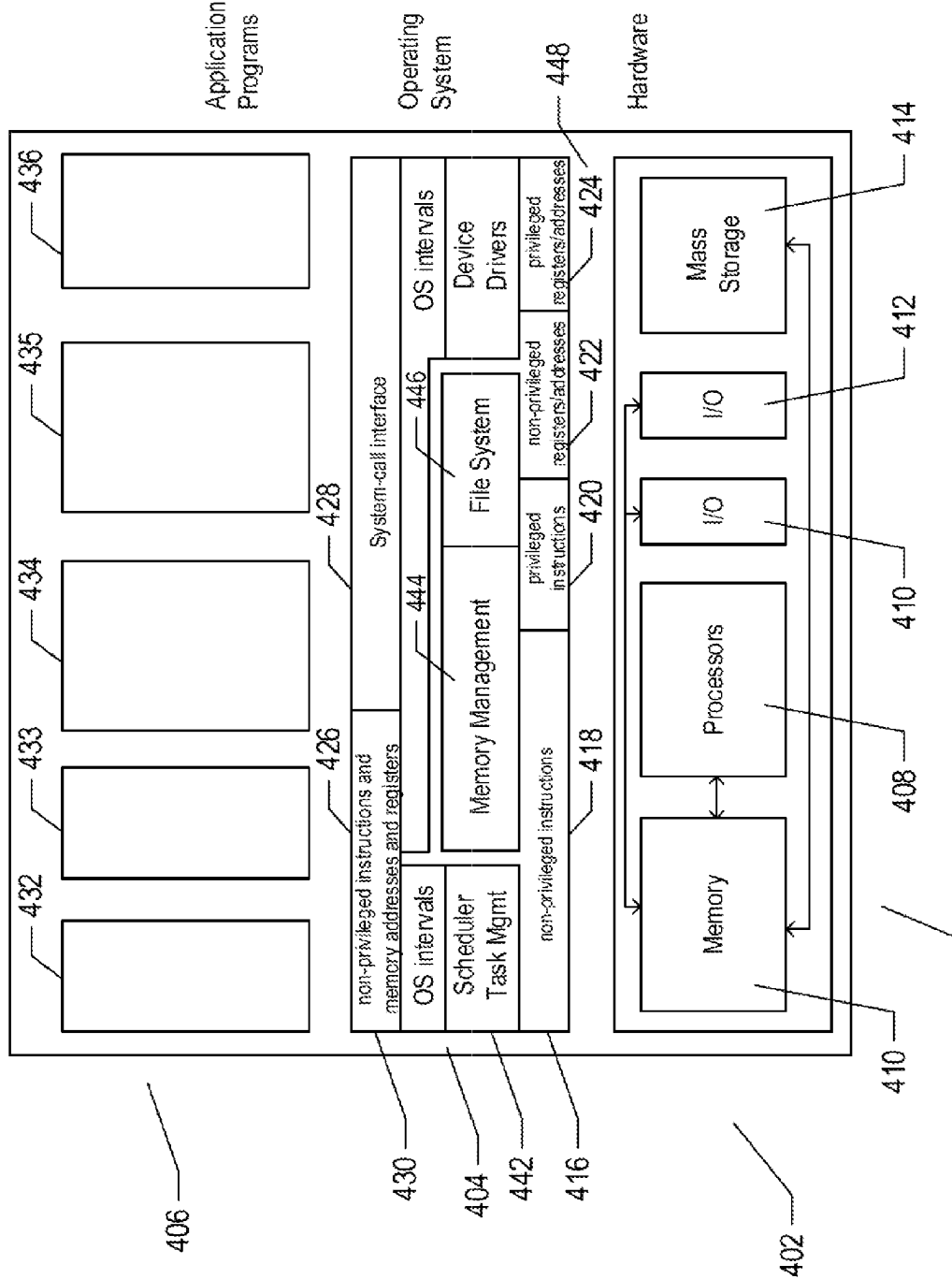
FIG. 4 shows generalized hardware and software components of a general-purpose computer system.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
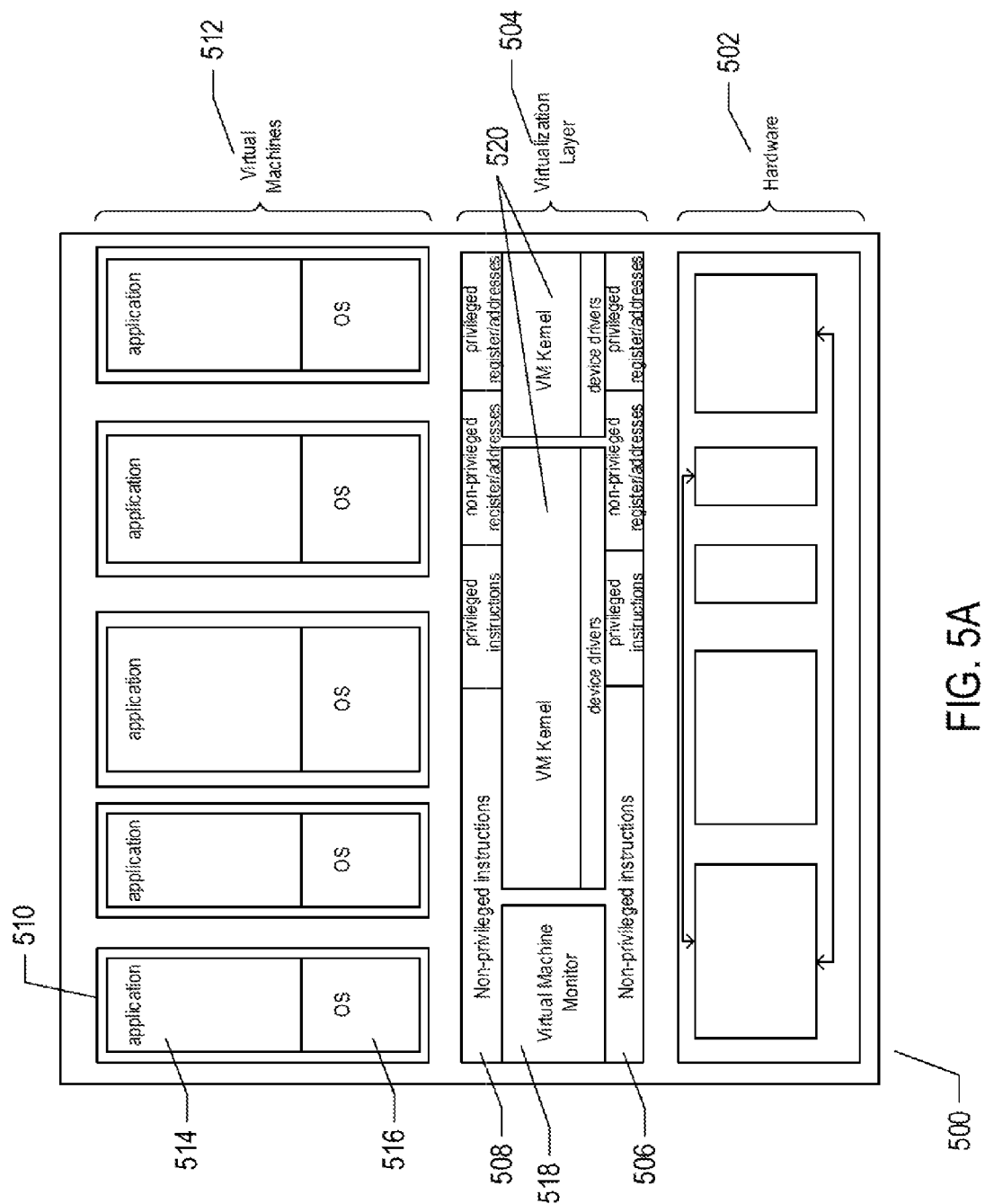
FIGS. 5A-5B show two types of virtual machine and virtual-machine execution environments.
Figure 5B:
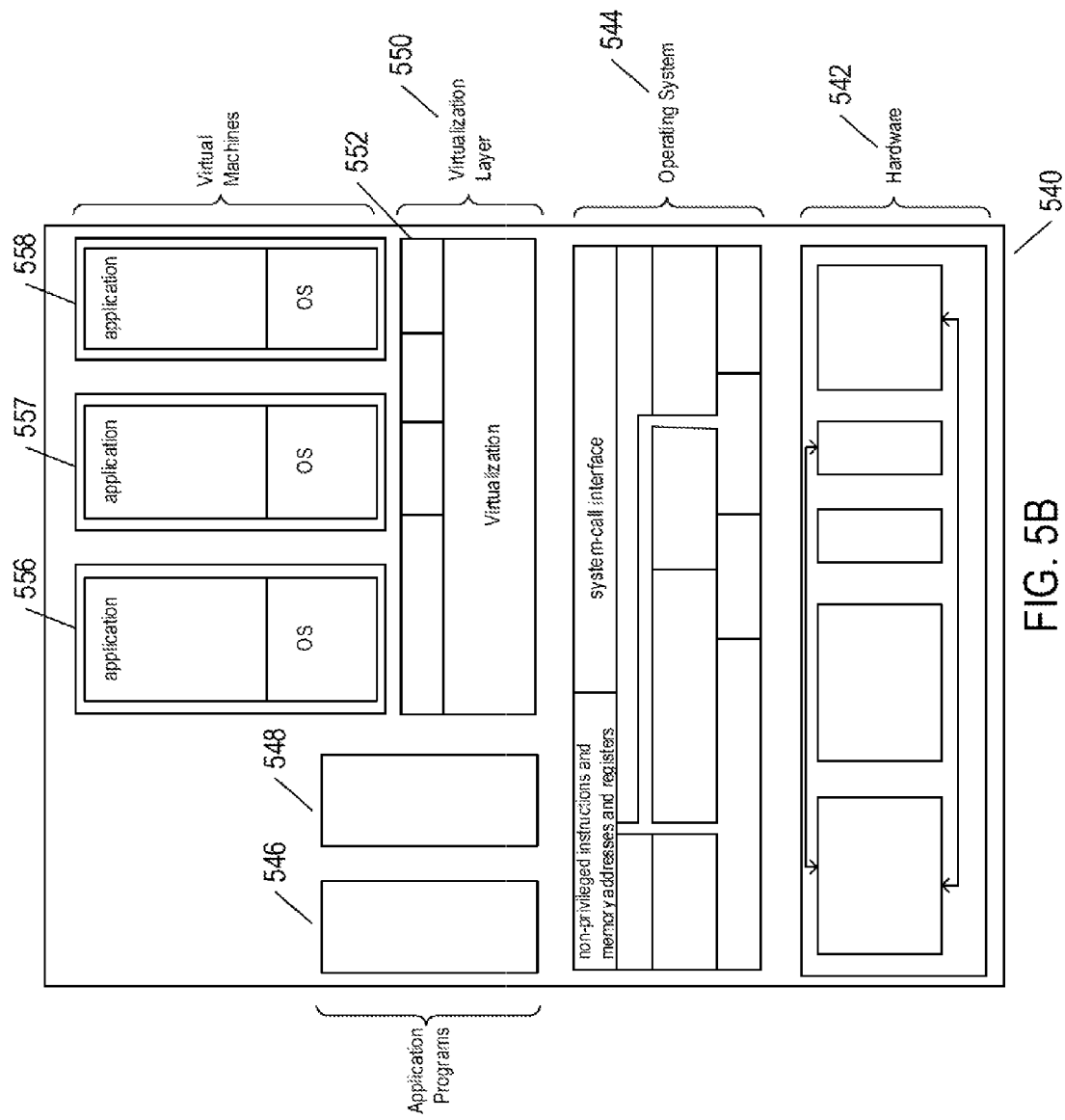

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of VMs and virtual-machine execution environments. Figures 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of VMs, such as VM 510, executing above the virtualization layer in a virtual-machine layer 512. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization-layer interface 508 rather than to the actual hardware interface 506. The virtualization layer partitions hardware resources into abstract virtual-hardware layers to which each guest operating system within a VM interfaces. The guest operating systems within the VMs, in general, are unaware of the virtualization layer and operate as if they were directly accessing a true hardware interface. The virtualization layer ensures that each of the VMs currently executing within the virtual environment receive a fair allocation of underlying hardware resources and that all VMs receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of VMs much like an operating system schedules execution of application programs, so that the VMs each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of VMs 556-558, each including one or more application programs or other higher-level computational entities packaged together with a guest operating system.

In Figures 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
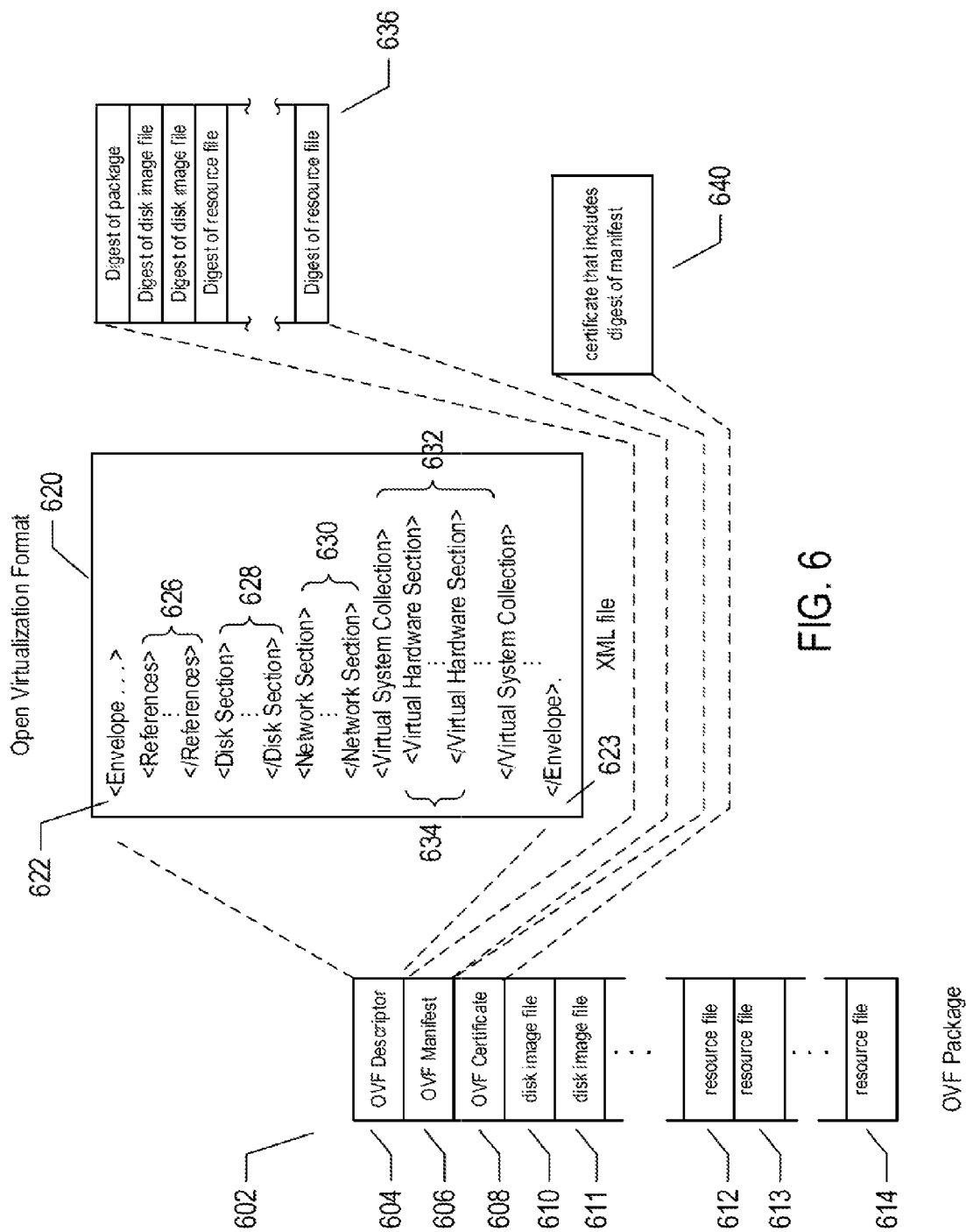
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
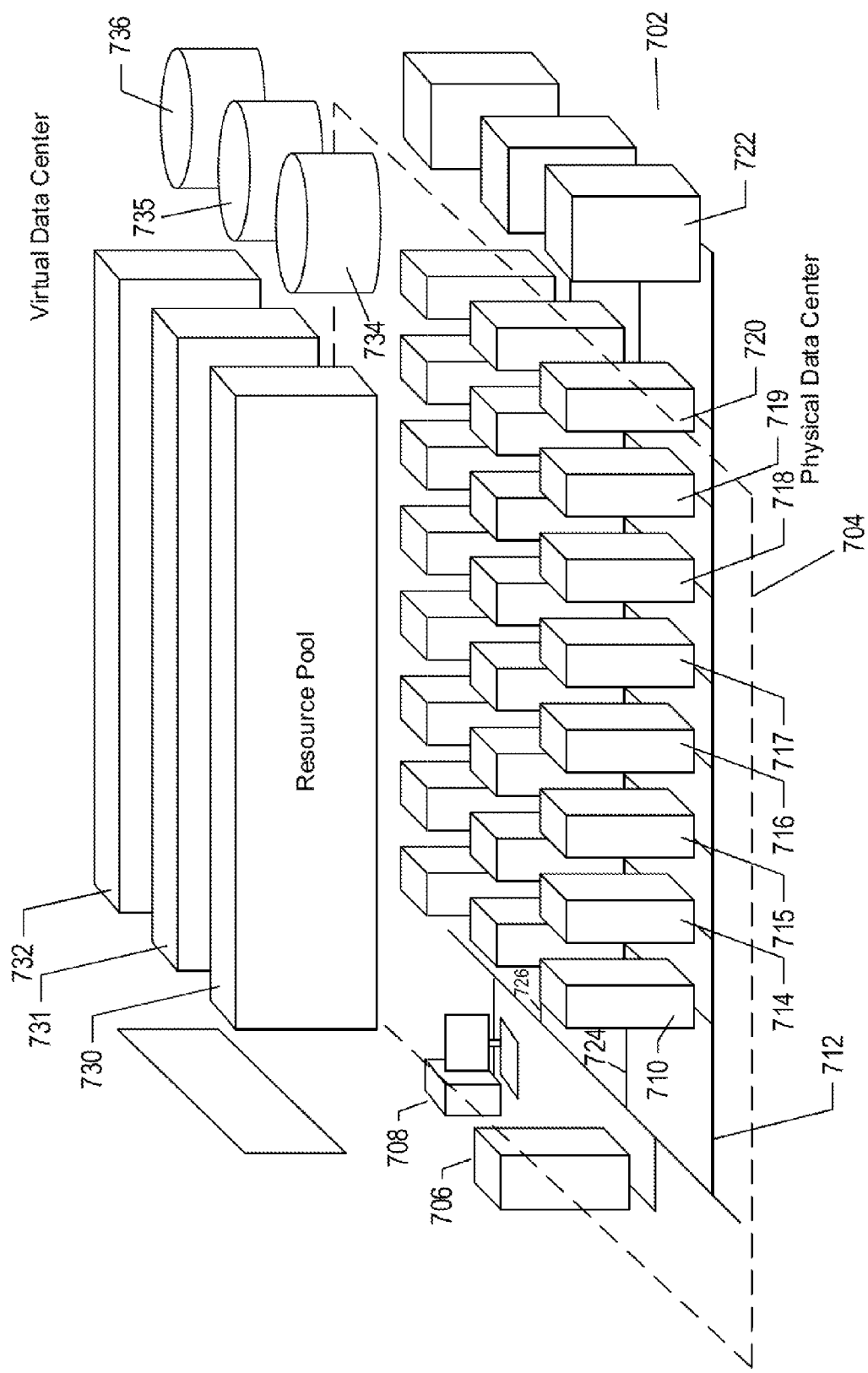
FIG. 7 shows virtual data centers provided as an abstraction of underlying physical-data-center hardware components.

FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of VMs with respect to resource pools, virtual data stores, and virtual networks, so that virtual-data-center administrators need not be concerned with the identities of physical-data-center components used to execute particular VMs. Furthermore, the virtual-data-center management server includes functionality to migrate running VMs from one physical server to another in order to optimally or near optimally manage resource allocation, provide fault tolerance, and high availability by migrating VMs to most effectively utilize underlying physical hardware resources, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the resources of individual physical servers and migrating VMs among physical servers to achieve load balancing, fault tolerance, and high availability.

Figure 8:
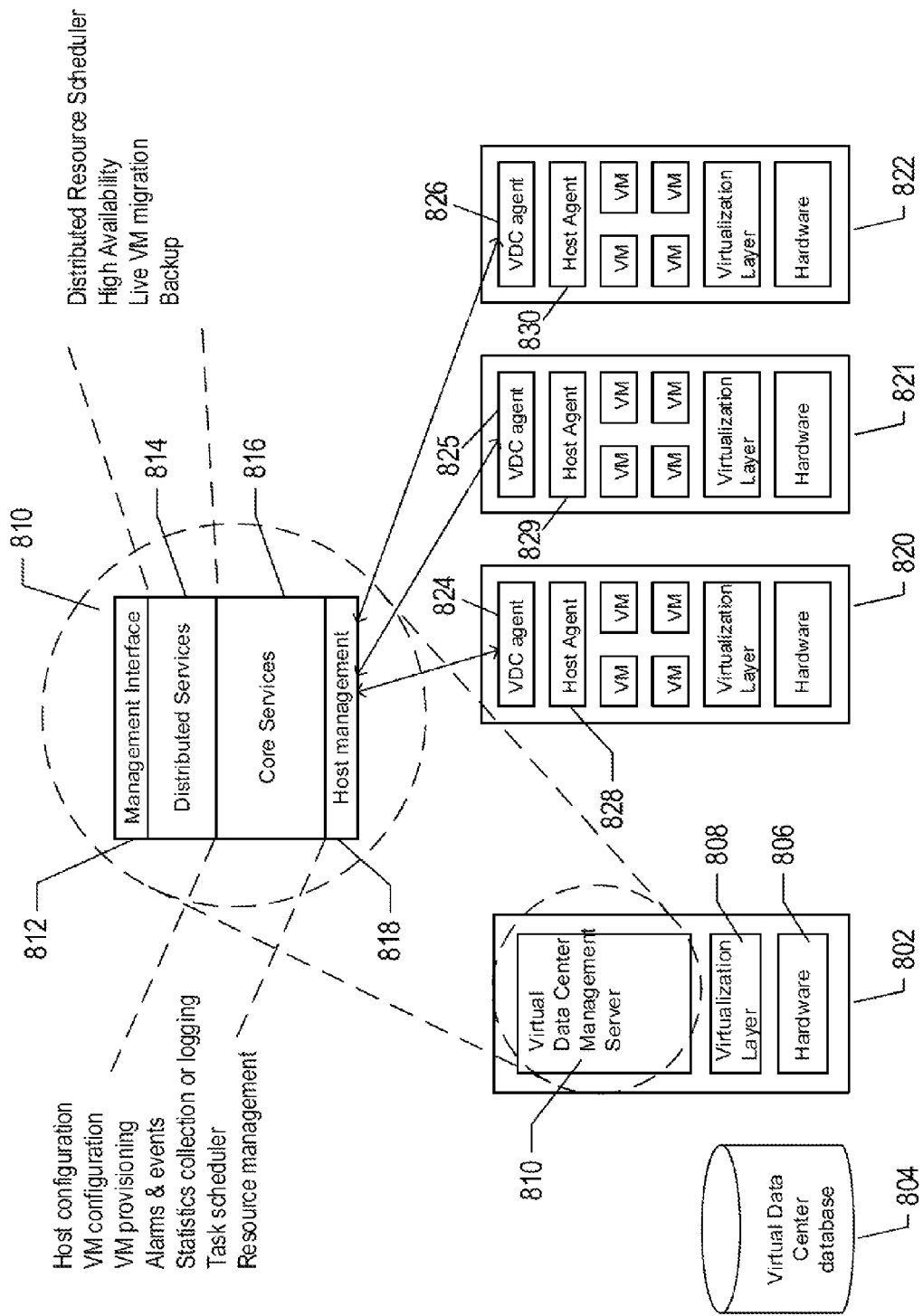
FIG. 8 shows virtual-machine components of a virtual-data-center management server and physical servers of a physical data center.

FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server VM 810 above the virtualization layer. Although shown as a single server in FIG. 8, the virtual-data-center management server ("VDC management server") may include two or more physical server computers that support multiple VDC-management-server virtual appliances. The VM 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the physical servers of the physical data center that is abstracted to a virtual data center by the VDC management server.

The distributed services 814 include a distributed-resource scheduler that assigns VMs to execute within particular physical servers and that migrates VMs in order to most effectively make use of computational bandwidths, data-storage capacities, and network capacities of the physical data center. The distributed services further include a high-availability service that replicates and migrates VMs in order to ensure that VMs continue to execute despite problems and failures experienced by physical hardware components. The distributed services also include a live-virtualmachine migration service that temporarily halts execution of a VM, encapsulates the VM in an OVF package, transmits the OVF package to a different physical server, and restarts the VM on the different physical server from a virtual-machine state recorded when execution of the VM was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent VM 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
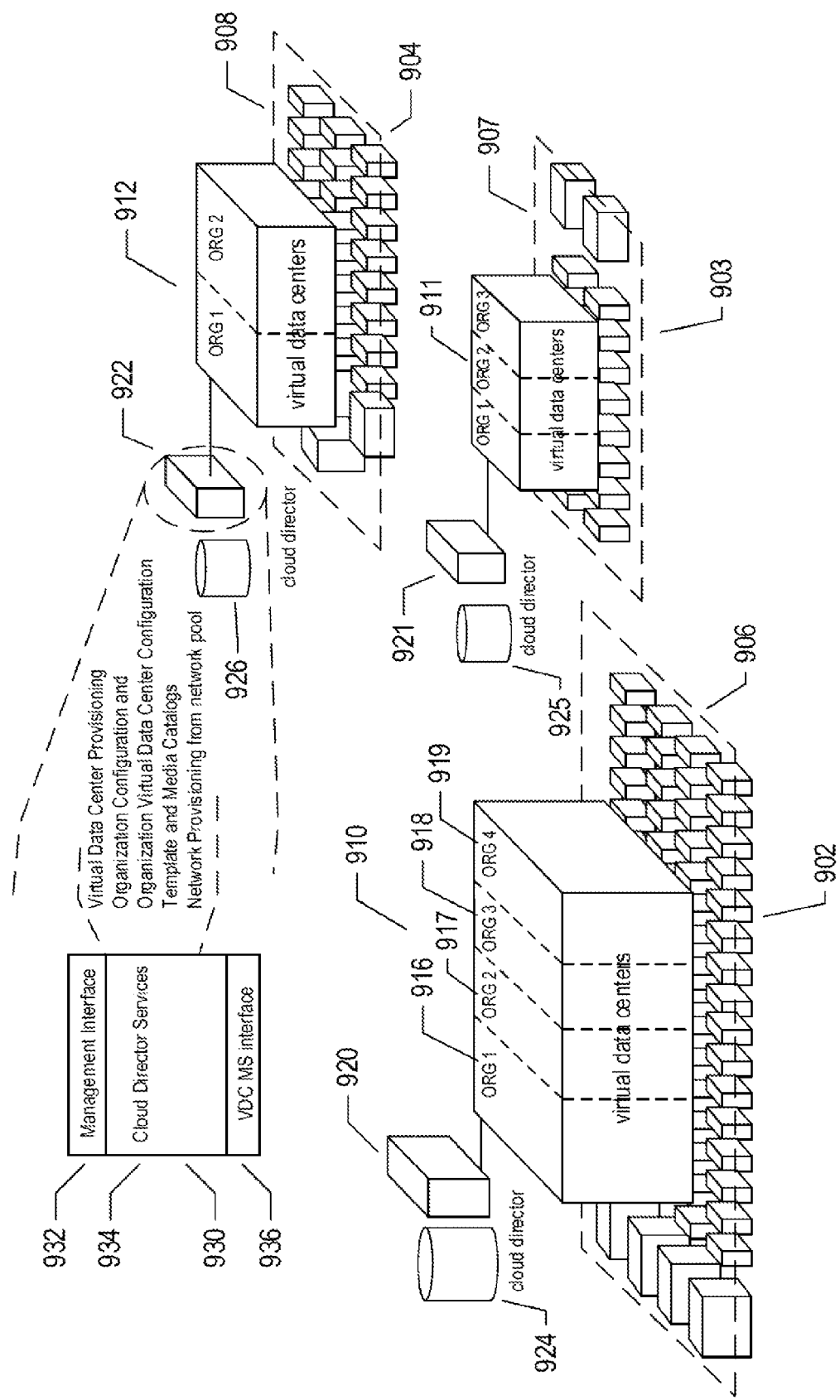
FIG. 9 shows a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
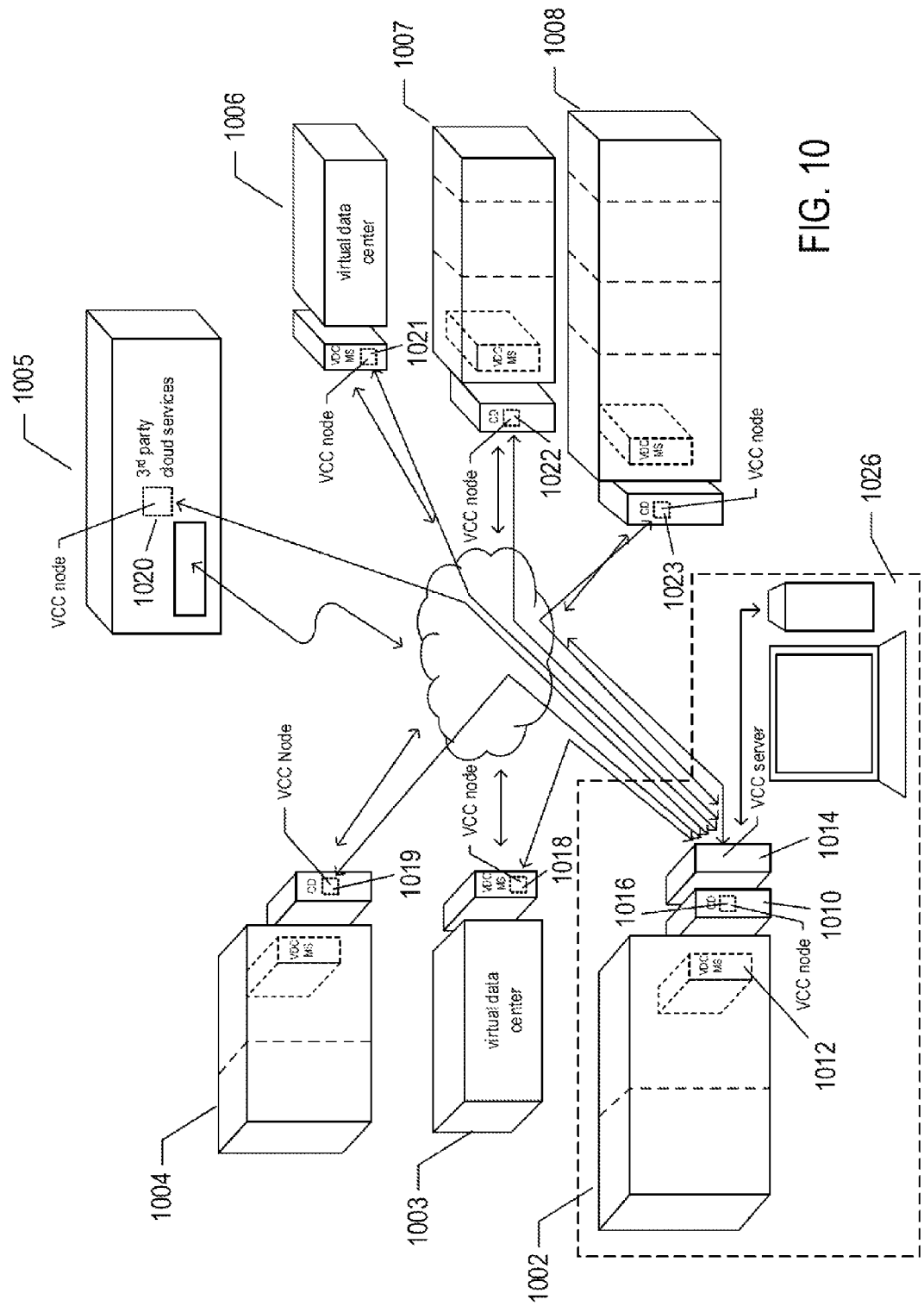
FIG. 10 shows virtual-cloud-connector nodes.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Computational Methods of Optimizing Virtual Machine Power Consumption

Figure 11:
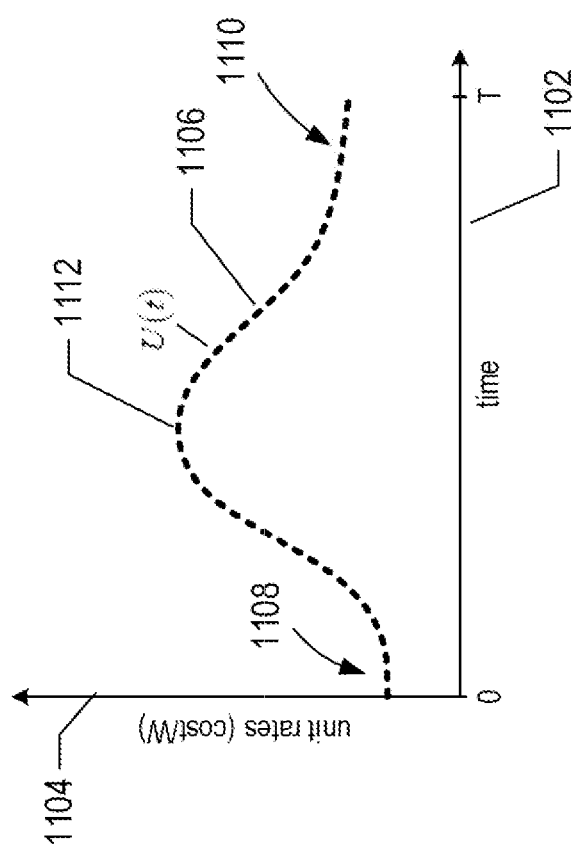
FIG. 11 shows a plot of a synthetic electrical energy unit-rate profile.

A general description of methods of optimizing VM power consumption is now provided with reference to FIGS. 11-16. FIG. 11 shows a plot of a synthetic electrical energy unit-rate profile. In the example of FIG. 11, horizontal axis 1102 represents time and vertical axis 1104 represents unit-rate cost of electrical energy in units of cost per watt. Dashed-line curve 1106, denoted by U(t), represents a unit-rate profile cost of consuming electrical energy at any point in time over a period between time 0 and time T. The unit rates charged by an electrical utility depend largely on the overall customer demand for electrical power over the period. For example, the period between time 0 and time T may represent any period of time, such as a month, weeks, a week, 24 hours or an hour, and the unit-rate profile 1106 represents time-dependent unit rates an electrical utility charges for electrical power usage over the period. Tails 1108 and 1110 of the unit-rate profile 1106 represent low unit rates that may correspond to times in the period when the demand for electricity is low, such as nighttime, while higher unit rates around maximum 1112 may correspond to times when the demand for electricity is high, such as during the middle of the day.

Another example of variable unit-rate cost over a period of time relates to green data centers. A green data center uses various renewable sources of electrical energy, such as solar, wind, and tidal movement. A green data center smart grid only draws only electrical power from a primary electrical energy source, such as a utility company, when the electrical energy supplied by the renewable energy sources is insufficient to meet the electrical power demands of the green data center. The variable unit rates in the example may be predictable during the period. For example, a green data center that uses solar generated electrical power as a source of electrical energy, may have a lower demand for electrical energy provided by a utility company during the daylight hours than during nighttime hours. As a result, the data center's unit rate of electricity is lower during daylight hours than during nighttime hours.

Figure 12:
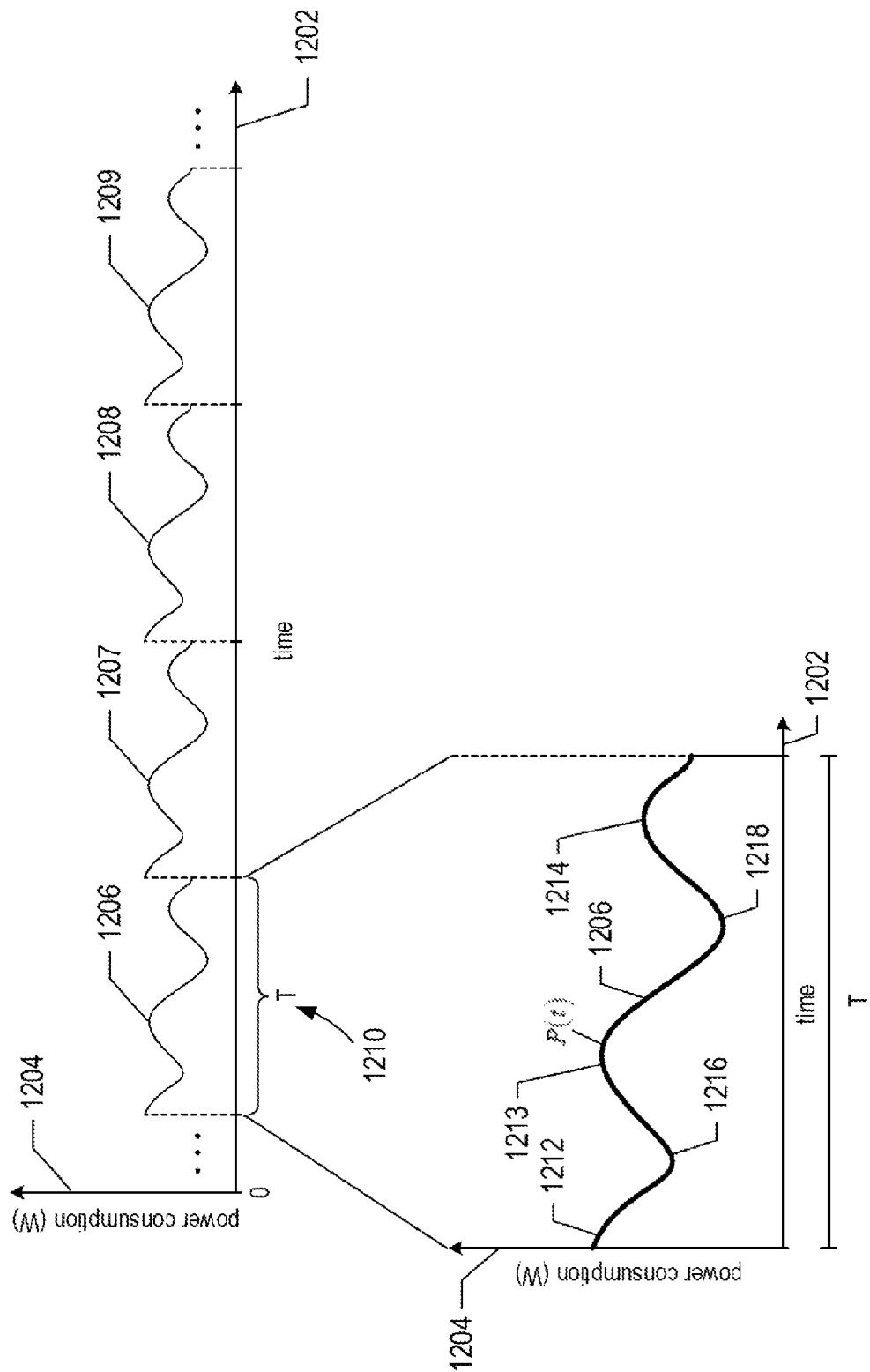
FIG. 12 shows an example plot of power consumption of a periodically scheduled virtual machine.

Utilization of each VM in a data center is monitored over time in order to identify those VMs that are running periodically scheduled workloads. FIG. 12 shows an example plot of power consumption of a VM that runs a periodically scheduled workload in a data center. In FIG. 12, horizontal axis 1202 represents time and vertical axis 1204 represents power consumption in watts. Curves 1206-1209 represent periodic power-consumption profiles of the VM over four consecutive periods determined by a VMM that monitors power consumption of the various VMs running in a data center. Each time period is of duration T. Each of the curves 1206-1209 represents approximately the same variable power-consumption profile repeated by the VM for each period. For example, FIG. 12 shows an enlargement of power consumption profile 1206, denoted by P(t), over a first time period 1210. The function P(t) represents electrical power consumption at any point in time by the VM within the period. For example, peaks 1212-1214 represent peak power consumption resulting from high computationally demanding workloads produced by the VM, and troughs 1216 and 1218 represent low power consumption resulting from lower computationally demanding workloads.

Figure 13:
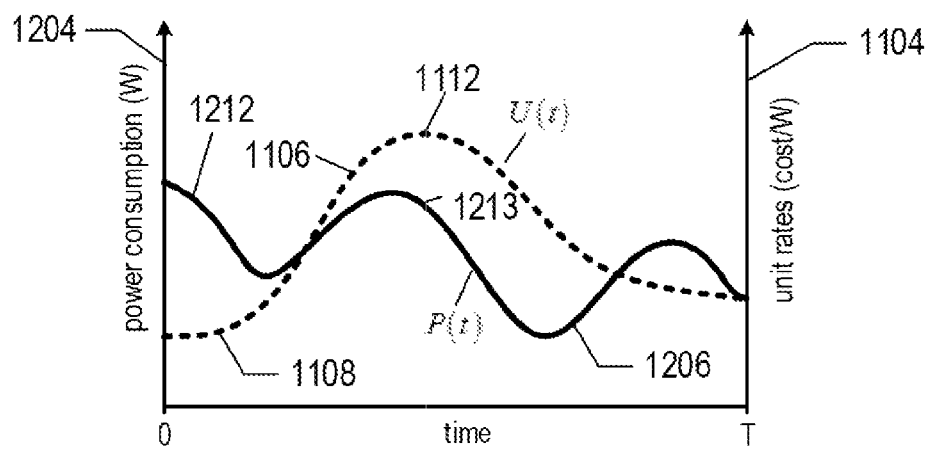
FIG. 13 shows a power-consumption profile and a unit-rate profile plotted together.

FIG. 13 shows a plot of both the power-consumption profile 1206 for the VM, shown in FIG. 12, and the unit-rate profile 1106, shown in FIG. 11. The power-consumption profile 1206 does represent power consumption resulting from an optimum workload schedule for the VM based on the unit-rate profile 1106 shown in FIG. 1. For example, although the workload associated with peak power consumption 1212 is scheduled during low unit rates 1108, the workload associated with peak power consumption 1213 is scheduled for execution when the unit rates are high near maximum unit rate 1112.

Methods and systems optimize a VM's power consumption over a period of time with the constraint that the workload performed by the VM does not change over the period. In general, the total workload W used to run the VM over the period of duration T is calculated according to:

$$W = \int_{t=0}^{T} P(t)\,dt \tag{1}$$

Figure 14:
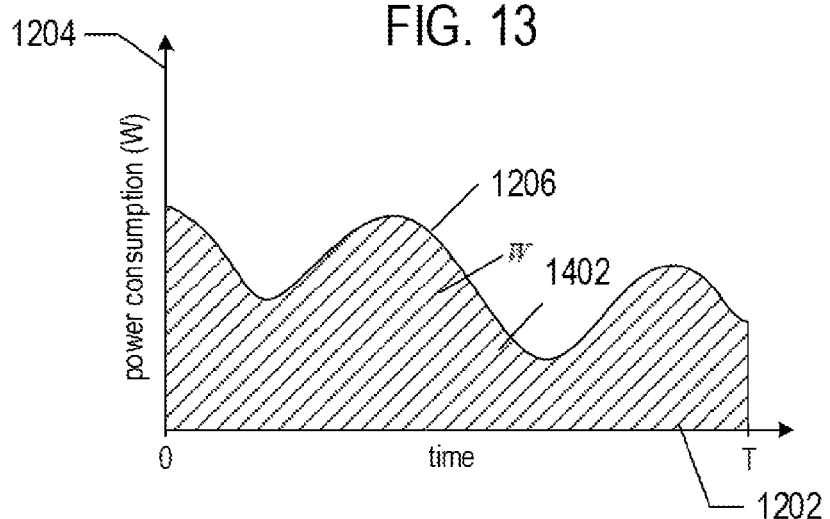
FIG. 14 shows a plot of a power-consumption profile with a workload represented by shading.

FIG. 14 shows a plot of the power-consumption profile 1206 with the workload W represented by a shaded region 1402 between the power-consumption profile 1206 and the time axis 1202 and over the period between time 0 and time T. The cost of operating a VM with a power-consumption profile over a period time based on a unit rate profile may be calculated according to:

$$C(P, U) = \int_{t=0}^{T} P(t) \cdot U(t)\,dt \tag{2}$$

Let $P_{opt}(t)$ represent an optimum power-consumption profile over the period. The optimum power-consumption profile minimizes the cost as follows:

$$C(P_{opt}, U) = \int_{t=0}^{T} P_{opt}(t) \cdot U(t)\,dt \leq C(P, U) \tag{3a}$$

subject to the constraint that $$W = \int_{t=0}^{T} P_{opt}(t)\,dt \tag{3b}$$

In other words, the optimum power-consumption profile $P_{opt}(t)$ satisfies the conditions $$\left.\frac{\partial C}{\partial P}\right|_{P=P_{opt}} = 0 \tag{4a}$$

and $$\left.\frac{\partial^2 C}{\partial P^2}\right|_{P=P_{opt}} > 0 \tag{4a}$$

An additional constraint is that the power-consumption profile P(t) is bounded over the period. In particular, the power consumption lies in an interval $[P_{min}, P_{max}]$, where $P_{min}$ represents the minimum power consumption over the period and $P_{max}$ represents the maximum power consumption over the period.

Figure 15:
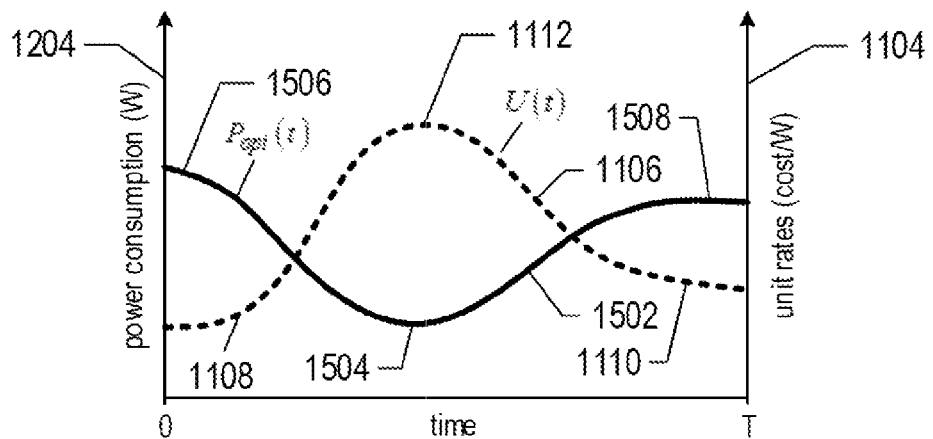
FIG. 15 shows a unit-rate profile and an optimum power-consumption profile plotted together.

FIG. 15 shows a plot of the unit-rate profile 1106, shown in FIG. 1, and a curve 1502 that represents an optimum power-consumption profile for the VM. In this example, minimum power consumption region 1504 of the profile 1502 occurs when unit rates are high around maximum unit rates 1112 and maximum power consumption regions 1506 and 1508 of the profile 1502 occur around low unit rates 1108 and 1110. In other words, for this synthetic example, the optimum power-consumption profile 1502 minimizes power consumption by substantially aligning minima of the optimum power-consumption profile 1502 with maximum unit-rate cost of the unit-rate profile 1106 and substantially aligning maxima of the optimum power-consumption profile 1502 with minimum unit-rate cost of the unit-rate profile 1106.

An optimum power-consumption profile determined for a period may be used to reschedule workloads for the VM over the same period with the constraint that the total workload W of the VM remains the same over the period. Rescheduling the workload of a VM may be accomplished by aligning in time the workload for the VM with the optimum power-consumption profile. For example, the optimum power-consumption profile 1502 of FIG. 15 represents the optimum power consumption for the VM that originally had a workload schedule with the power-consumption profile 1206. Electrical power consumption of the VM substantially matches the optimum power-consumption profile by rescheduling the workload of the VM within the period to track the optimum power-consumption profile 1502.

Figure 16:
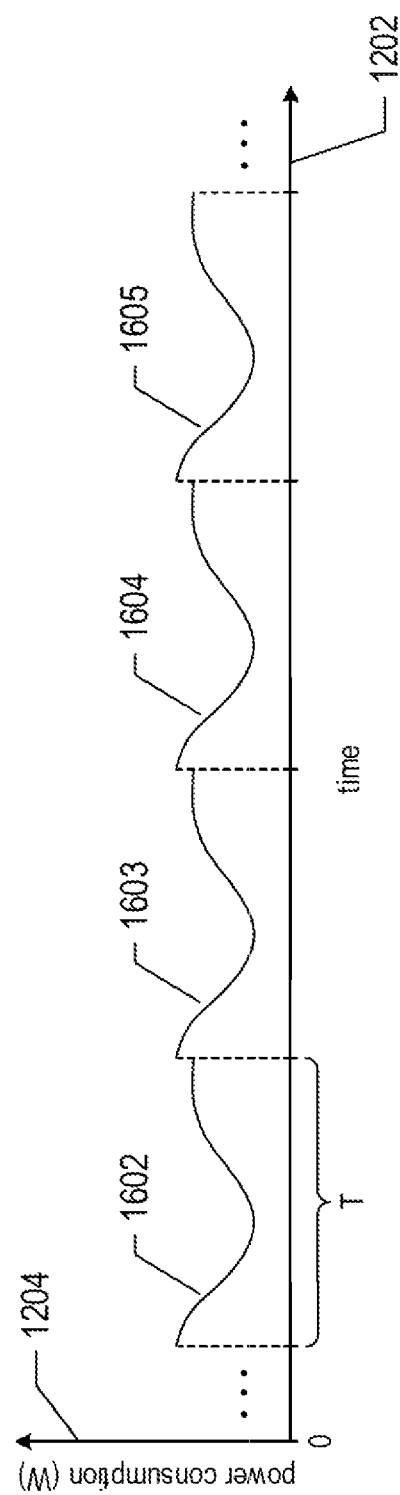
FIG. 16 shows a plot of optimum, periodic power consumption of a virtual machine over time.

FIG. 16 shows an example plot of optimum, periodic power consumption over time for the VM with original periodic power consumption represented in FIG. 12. In this example, the VM workload over each period is rescheduled to track the optimum power-consumption profile 1502 of FIG. 15. Curves 1602-1605 represent the optimum power-consumption profile for the VM within each period and correspond to the optimum power-consumption profile 1502. FIG. 16 represents minimizing the cost of running the VM over time by rescheduling the VM workload within each period such that the power used by the VM in each period substantially matches the optimum power-consumption profile.

Equations (1) through (4) provide a general mathematical characterization of optimizing VM power consumption based on unit rate and power-consumption profiles that are continuous in time. Typical unit rate and power-consumption profiles are not continuous over an entire period but are instead composed of discrete constant unit-rate levels, denoted by $U_j$, and power levels, denoted $P_j$, over intervals of time denoted by $\Delta t$. The total workload W of a VM with a set of N power levels $\{P_j\}_{j=0}^{N-1}$ over a period of duration T is calculated according to a sum:

$$W = \sum_{j=0}^{N-1} P_j \Delta t \quad (5)$$

The set of power levels $P=\{P_j\}_{j=0}^{N-1}$ is called a power-consumption profile and the set of unit-rate levels $U=\{U_j\}_{j=0}^{N-1}$ is called unit-rate profile. The cost of a discrete power-consumption profile based on a discrete unit-rate profile is calculated according to:

$$C(P, U) = \sum_{j=0}^{N-1} P_j \cdot U_j \cdot \Delta t \quad (6)$$

Let the set $P'=\{P'_j\}_{j=0}^{N-1}$ represent an optimum power-consumption profile over the same period. The optimum power-consumption profile minimizes the power cost as follows:

$$C(P', U) = \sum_{j=0}^{N-1} P'_j \cdot U_j \cdot \Delta t \le C(P, U) \quad (7a)$$

subject to the constraint that $$W = \sum_{j=0}^{N-1} P'_j \Delta t \quad (7b)$$

Figure 17:
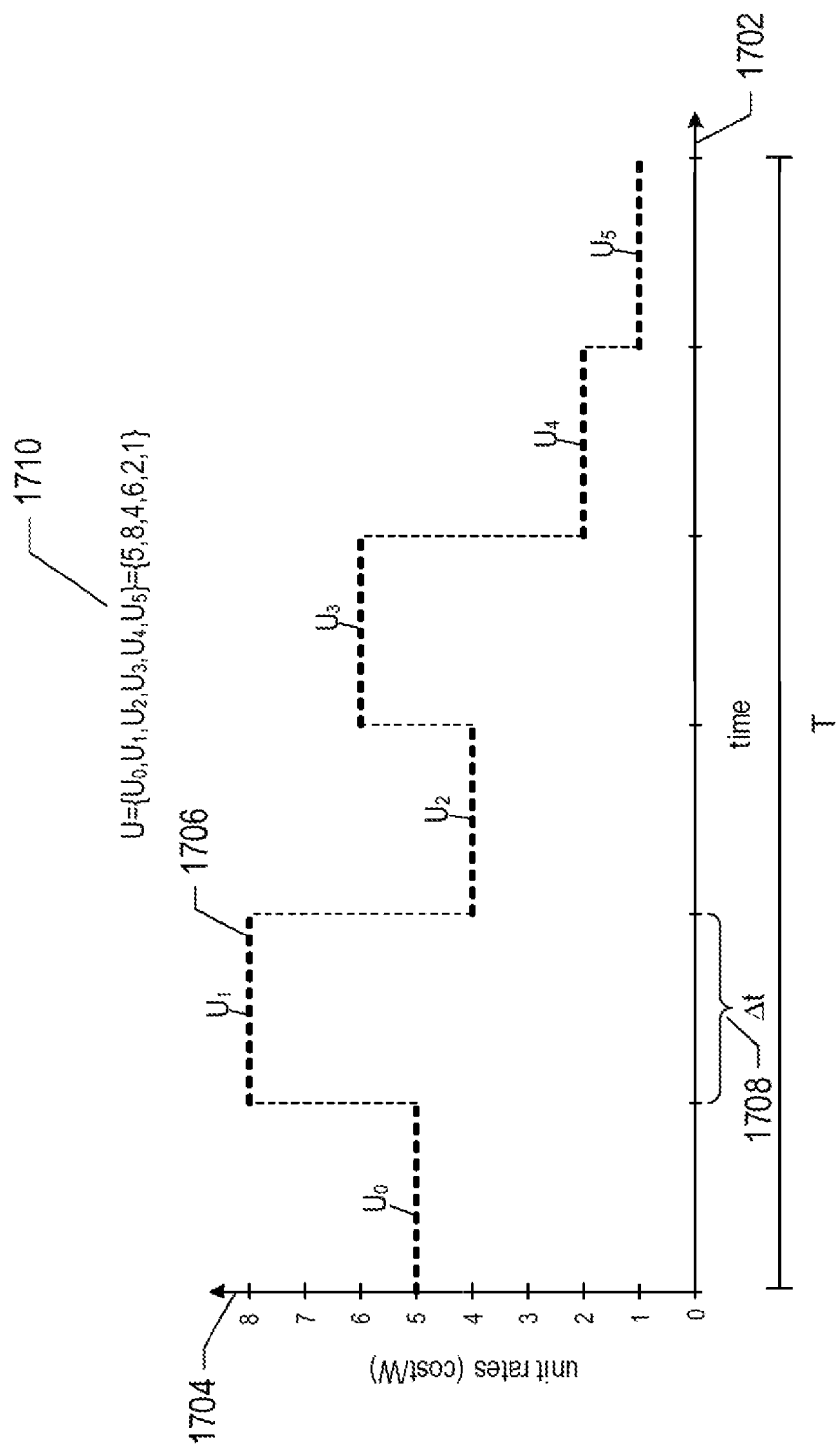
FIG. 17 shows a plot of a discrete unit-rate profile over a period.

Computational methods of optimizing VM power consumption are now described with reference to a specific example of unit rates shown in FIG. 17 and power consumption shown in FIG. 18. FIG. 17 shows a plot of example discrete unit-rate profile over a period of duration T. Horizontal axis 1702 represents time and vertical axis 1704 represents unit rate cost per watt. The period may represent any period of time, such as a month, weeks, a week, 24 hours or an hour. In this example, the discrete unit-rate profile over the period is illustrated as a step function with different unit-rate levels represented by dashed-line segments, such as dashed-line segment 1706, that correspond to specific intervals of time. For example, unit-rate level 1706 represents a unit rate of 8 monetary units charged per watt of electrical power used in a time interval 1708. The six unit-rate levels are denoted by $U_0$, $U_1$, $U_2$, $U_3$, $U_4$, and $U_5$ and organized into a unit-rate profile set 1710 denoted by U.

Figure 18:
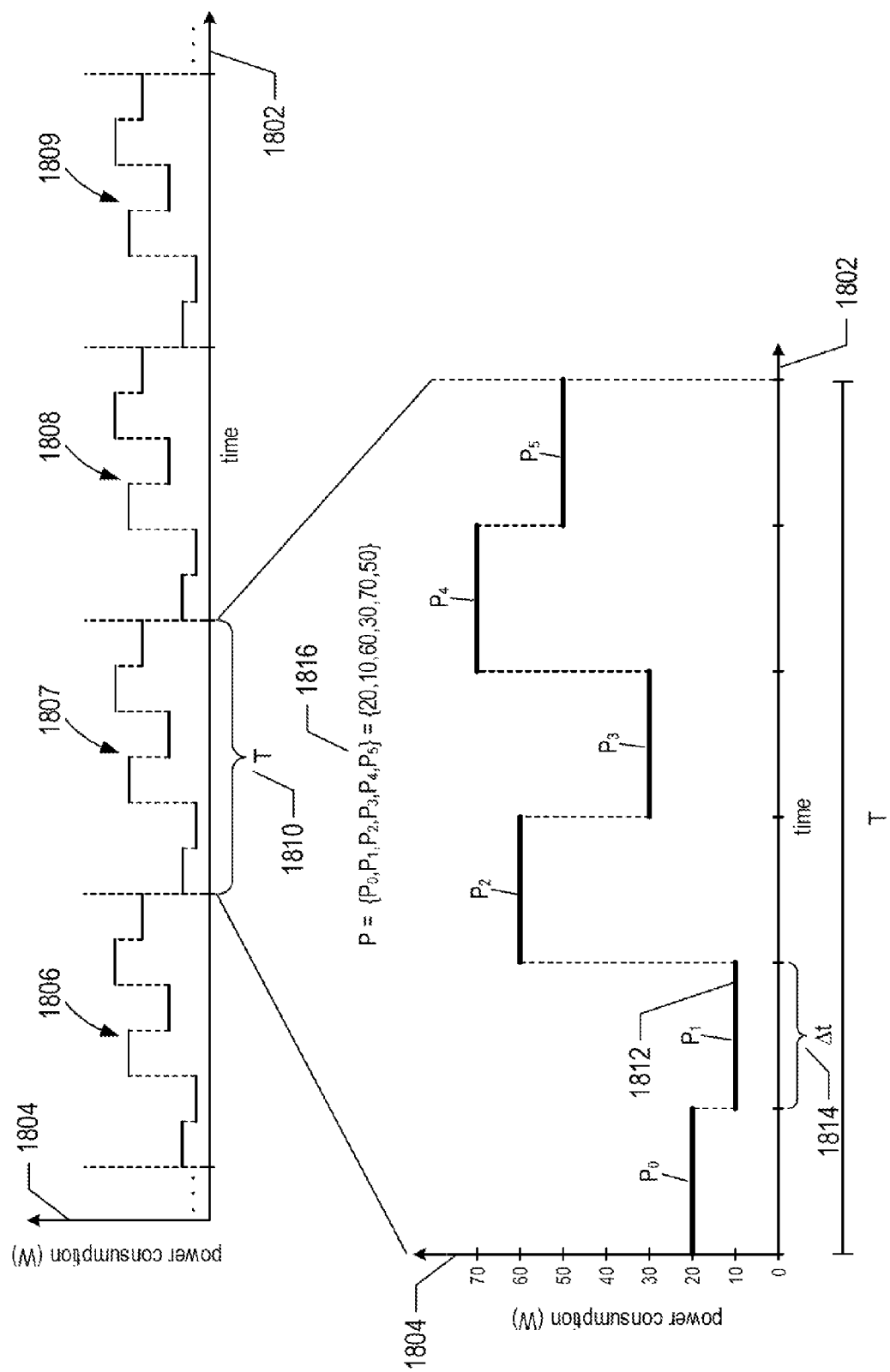
FIG. 18 shows a plot of power consumption of a periodically scheduled virtual machine.

FIG. 18 shows an example plot of power consumption of a VM that runs a periodically scheduled workload over a series of periods. Horizontal axis 1802 represents time and vertical axis 1804 represents power consumption in watts. Step functions 1806-1809 represent a repeated discrete VM power-consumption profile for each period determined by a VMM that monitors power consumption of the various VMs running in a data center. The step functions 1806-1809 all represent approximately the same discrete power-consumption profile of electrical power used by the VM for each period. FIG. 18 also shows an enlargement of the power-consumption profile 1806 over a period 1810. Each profile is composed of the same series of power levels represented by line segments, such as line segment 1812, that correspond to specific intervals of time. For example, power level 1812 represents a constant electrical power usage of 10 watts by the VM in the time interval 1814. The six power levels are denoted by $P_0$, $P_1$, $P_2$, $P_3$, $P_4$, and $P_5$ and organized into a power-consumption set 1816 denoted by P.

For the sake of simplicity, the number of unit-rates levels of the unit-rate profile of FIG. 17 and the number of power levels of the power-consumption profile of FIG. 18 are the same and the unit-rate levels and power levels are all of the same duration $\Delta t$. Methods and systems described below are not limited to determining optimum power-consumption profiles based on power-consumption profiles and unit-rate profiles with the same number of levels of the same duration. Methods and systems may be used to compute optimum power-consumption profiles based on profiles with differing numbers of unit-rate levels and power levels unit-rate levels and power levels of different durations.

A method for determining an optimum power-consumption profile for a VM based on discrete unit-rate and power-consumption profiles may be executed according to the following pseudo-code:

```
1    assign an index to each unit rate in a set of N unit rates U;
2    form an ordered set of unit rates U_sort from the set of unit rates U;
3    form an index set S of the order indices for the set U_sort;
4    compute W = Σ^{N-1}_{j=0} P_j Δt; \\total workload for a power
       consumption set P
5    initialize an optimum power-consumption profile P' with P'_i = P_min
       of the P for all
6       elements of the set P;
7    form an ordered power consumption set {P''_j} by ordering
       the power consumption
8       levels of the set P;
9    for (k = 0; k <= N - 1; k ++) { \\k is the index for the set S
10      compute error e = W - Σ^{N-1}_{i=0} P'_i Δt;
11      find P_max = max P; \\maximum of power consumption set P
12      S[k] = j;
13      read P''_j from {P''_j};
14      compute incr = min(e/Δt, P_max - P''_j);
15      compute P'_j = P''_j + incr;
16      if e ≠ 0 then
17         P = P - P_max; \\subtract P_max from P
18      else
19         STOP;
20   }
```

FIGS. 19-21 show an application of the pseudo-code to the example unit-rate and power-consumption profiles described above with reference to FIGS. 17 and 18. FIG. 19 shows the unit rates of the unit-rate set U 1710 of FIG. 17 sorted into an ordered unit-rate set $U_{sort}$ 1902. An index set S 1904 is formed from the indices of the unit rates in the ordered unit-rate set $U_{sort}$ 1902. FIG. 19 additionally includes an iteration-index set 1906 for the for-loop beginning in line 9 of the pseudo-code.

FIG. 20 shows the power-consumption set P 1816 of FIG. 18 and a total workload W 2002 computed according to Equation (5) in line 4 of the pseudo-code from the power levels of the power-consumption set P 1816 and the time interval Δt. FIG. 20 additionally includes an optimum power-consumption set P' 2004 with each power level initialized to the minimum power level of the power-consumption set P 1816 and an ordered power-consumption set $\{P''_j\}$ 2006 composed of the power levels of the power-consumption set P 1816 order from smallest to largest.

FIGS. 21A-21F show computation of an optimum power-consumption profile according to lines 9-20 of the pseudo-code applied to the unit-rate and power-consumption sets of FIGS. 19 and 20. FIG. 21A shows computation according to lines 10-19 of the pseudo-code for a first iteration k=0. In line 2101, an error is calculated according to $$e = W - \sum_{i=0}^{N-1} P'_i \Delta t \qquad (8)$$

where $P'_i$ is an element of the optimized power-consumption set $\{P'_i\}_{i=1}^{N-1}$.
Calculation of the error is executed in line 10 of the pseudo-code. In line 2102, the maximum power level in the set P is determined according to line 11 of the pseudo-code. In line 2103, the index j is assigned the value of the first index S[0]=5 of the set S 1904 according to line 12 of the pseudo-code. In line 2104, power level $P''_5=70$ is read from the ordered power-consumption set $\{P''_j\}$ according to line 13 of the pseudo-code. In line 2105, the quantity "incr" is computed according to $$incr = \min\left(\frac{e}{\Delta t}, P_{max} - P''_j\right) \qquad (9)$$

as represented in line 14 of the pseudo-code. In line 2106, the power level $P'_5$ in the optimum power-consumption set P' is computed according to $$P'_j = P''_j + incr \qquad (10)$$

as represented in line 15 of the pseudo-code. As a result, the optimum power-consumption profile becomes P'={10,10,10,10,10,70}. In line 2107, because the error "e" does not equal "0," the set P is prepared for the next iteration by deleting $P_{max}$ from the set P according to line 17, and in line 2109, the index k is incremented.

FIGS. 21B-21F show computation according to lines 10-19 of the pseudo-code for subsequent iterations with k=1, 2, 3, 4, 5. Lines 2110-2114 in FIGS. 21B-21F, respectively, correspond to updating the optimum power-consumption set P'={30,10,50,20,60,70}, which represents the optimum power-consumption profile for the VM.

Figure 22A:
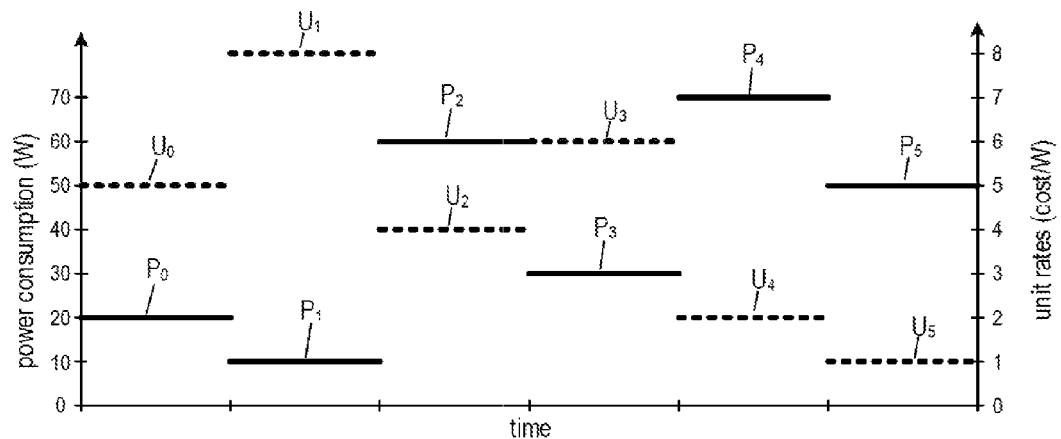
FIG. 22A shows a unit-rate profile and a power-consumption profile plotted together.
Figure 22B:
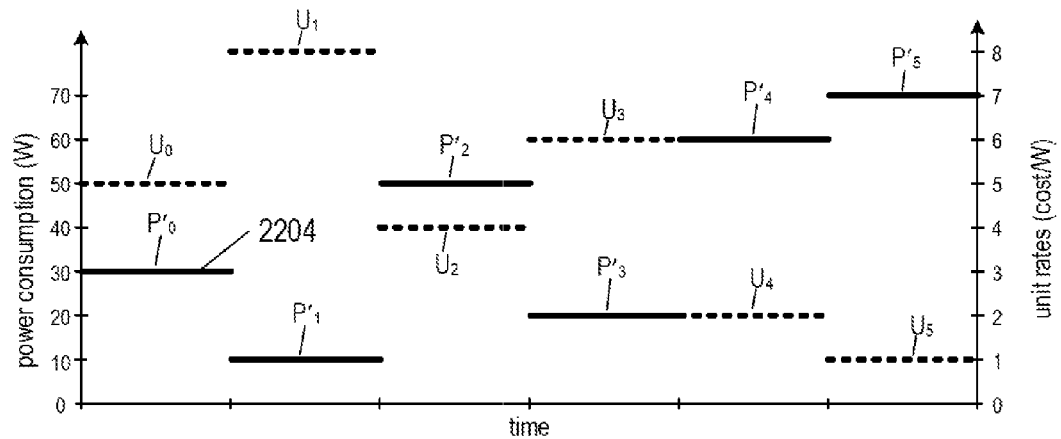
FIG. 22B also shows a unit-rate profile and an optimum power-consumption profile plotted together.

FIG. 22A shows the unit-rate profile of FIG. 17 and the power-consumption profile of FIG. 18 plotted together. The power cost 2202 of the power-consumption profile based on the unit-rate profile is calculated according to Equation (6) to be 920·Δt. FIG. 22B also shows the unit-rate profile of FIG. 17 and the optimum power-consumption profile represented by the set P'={30,10,50,20,60,70}. Line segments, such as line segment 2204, represent the power levels of the set P'. The power cost 2206 of the optimum power-consumption profile based on the unit-rate profile is calculated according to Equation (6) to be 740·Δt. In the example of FIGS. 17-22, the resulting optimum power-consumption profile P' is a rearrangement of the power levels in the power-consumption profile P.

A discrete optimum power-consumption profile determined for a period may be used to reschedule workloads for the VM over the same period with the constraint that the total workload W of the VM remains the same over the period. FIG. 23 shows an example plot of the periodic optimum power-consumption profile for the VM with original periodic power-consumption profile represented in FIG. 18. In this example, electrical power consumption of the VM substantially matches the optimum power-consumption profile by rescheduling the workload of the VM within the period to track the optimum power-consumption profile 2305. The cost of running the VM is minimized over time by rescheduling the VM workload for each period to match the power levels of the optimum power-consumption profile 2305.

Figure 24:
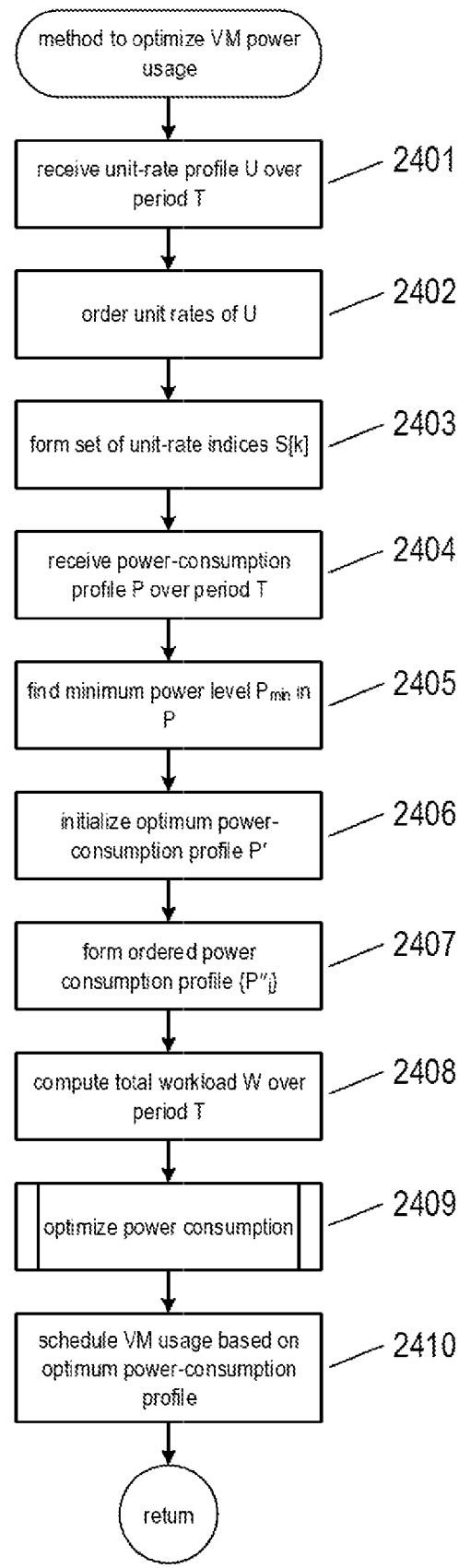
FIG. 24 shows a flow-control diagram of a method to optimize virtual machine electrical power usage.

FIG. 24 shows a flow-control diagram of method to optimize VM electrical power usage. In block 2401, a unit-rate profile is received. The unit-rate profile represents that cost of consuming electrical energy at any point in time over a period as described above with reference to FIGS. 11 and 17. In block 2402, the unit rates of the unit-rate profile are ordered from smallest to largest, as described above with reference to FIG. 19. In block 2403, a unit-rate index set S is formed with elements S[k] as described above in line 3 of the pseudo-code. In block 2404, a power-consumption profile is received for a VM. The power-consumption profile represents power consumption of the VM at any point in time during the period. In block 2405, a minimum power level $P_{min}$ in the power-consumption profile is determined. In block 2406, an optimum power-consumption profile P' is initialized. In block 2407, an ordered power-consumption profile $\{P''_j\}$ is formed from the power-consumption profile P as described above with reference to FIG. 20. In block 2408, total workload over the period is computed as described above with reference to Equation (5). In block 2409, a routine "optimize power consumption" is called to compute an optimum power-consumption profile for the VM. In block 2410, the VM is scheduled to have the optimum power-consumption profile.

Figure 25:
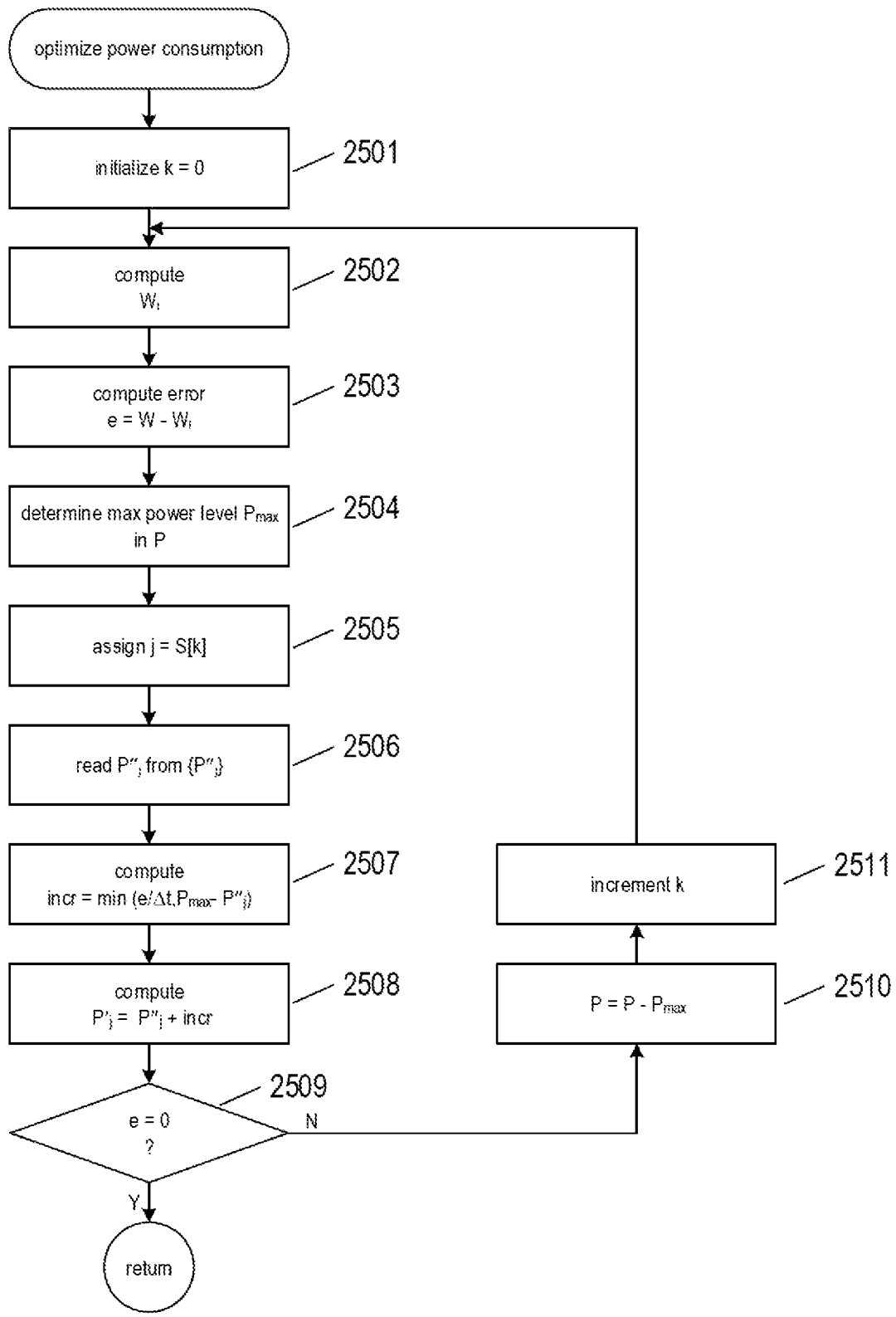
FIG. 25 shows a flow-control diagram of a routine "optimize power consumption" called in the flow-control diagram of FIG. 24.

FIG. 25 shows a flow-control diagram of the routine "optimize power consumption" called in block 2409 of FIG. 24. In block 2501, an index k is initialized to zero. In block 2502, a workload is computed for the optimum power-consumption profile as described above with reference to Equation (7b). In block 2503, error is computed between the workload for the original power-consumption profile P and the under construction optimum power-consumption profile P' as described above with reference to Equation (8). In block 2504, a maximum power level $P_{max}$ is determined form power-consumption profile P. In block 2505, an index j is assigned the value of an index S[k] in the unit-rate index set S. In block 2506, power level $P''_j$ is read from the ordered power-consumption set $\{P''_j\}$. In block 2507, the increment "incr" is computed as described above with reference to Equation (9). In block 2508, the power level $P'_j$ is updated in the optimum power-consumption profile as described above with reference to Equation (10). In decision block 2509, when error does not equal zero, control flows to block 2510 in which the maximum power level $P_{max}$ is deleted from the power-consumption profile P. In block 2511, the index k is incremented and operations represented by blocks 2502-2509 are repeated.

In the above discussion, optimization of power consumption is based on a lowest cost assumption. The correctness of this assumption is now proved by induction: (1) Up to line 5 in the pseudo-code above, there is no ambiguity of any alternate power distribution represented by power-consumption profile. Minimum power is consumed at any point in time. (2) Then in the first iteration as described above with reference to FIG. 21A, a point in time where U is minimum ($=U_1$) is taken and try to consume of as much power as possible in that instant. The additional cost incurred in this iteration is $C_1=(P_{max}-P_{min})U_1$, which is the lowest possible cost of all arrangements. For example, try consuming ($P_{max}-P_{min}$) power in any other iteration k. Because $U_k>U_1$, $C_k$ will be greater than $C_1$. Alternatively, try separating ($P_{max}-P_{min}$) into $P_x$ and $P_y$ units consumed at instants x and y, respectively. Even then the sum of cost $C_x$ and $C_y$ is greater than $C_1$. (3) In a second iteration as presented in FIG. 21B, a next point in time gives a second minimum $U_2$. The same logic as above holds true to say that the additional cost incurred in this iteration is $C_2=(P_{max}-P_{min})U_2$, which is the lowest possible cost of all remaining possible arrangements. As a result, in each iteration, the minimal possible additional cost are summed. This leads to minimum cost, C, when the method stops.

Although the above disclosure has been described in terms of particular implementations, it is not intended that the disclosure not be limited to these implementations. Modifications within the spirit of the disclosure will be apparent to those skilled in the art. For example, any of a variety of different implementations can be obtained by varying any of many different design and development parameters, including programming language, underlying operating system, modular organization, control structures, data structures, and other such design and development parameters. Thus, the present disclosure is not intended to be limited to the embodiments shown herein but is to be accorded the widest scope consistent with the principles and novel features disclosed herein.

The invention claimed is:

1. A system to schedule virtual machines comprising:
one or more processors;
one or more data-storage devices; and
a routine stored in the data-storage devices and executed using the one or more processors, the routine
determining an optimum power-consumption profile based on a power-consumption profile of a virtual machine over a period of time and a unit-rate profile of electrical power cost over the period of time, wherein the optimum power-consumption profile minimizes power consumption of the virtual machine by substantially aligning minima of the optimum power-consumption profile with maximum unit-rate cost of the unit-rate profile and substantially aligning maxima of the optimum power-consumption profile with minimum unit-rate cost of the unit-rate profile; and
rescheduling the virtual machine over the same period with a workload having the optimum power-consumption profile.

2. The system of claim 1 wherein the power-consumption profile represents power consumption of the virtual machine periodically scheduled over time.

3. The system of claim 1, wherein workload associated with the optimum power-consumption profile equals workload associated with the power-consumption profile.

4. The system of claim 1 wherein the optimum power-consumption profile minimizes power cost of the virtual machine execution.

5. A system to schedule virtual machines comprising:
one or more processors;
one or more data-storage devices; and
a routine stored in the data-storage devices and executed using the one or more processors, the routine
determining an optimum power-consumption profile based on a power-consumption profile of a virtual machine over a period of time and a unit-rate profile of electrical power cost over the period, wherein determining the optimum power-consumption profile further comprises:
computing a total workload based on the power-consumption profile;
ordering the unit-rate profile to generate an order unit-rate profile;
forming an ordered unit-rate index set from indices of the ordered unit-rate profile;
initializing a minimum power-consumption profile based on a minimum power level of the power-consumption profile;
ordering power levels of the power-consumption profile from smallest to largest in an ordered power-consumption profile; and
iteratively updating power levels of the minimum power-consumption profile to obtain the optimum power-consumption profile based on the ordered unit-rate index set and the ordered power-consumption profile; and
rescheduling the virtual machine over the period with a workload having the optimum power-consumption profile.

6. The system of claim 5 wherein iteratively updating power levels of the minimum power-consumption profile to obtain the optimum power-consumption profile further comprises:
for each iteration,
computing a workload based on the minimum power-consumption profile;
computing an error difference between the total workload and the workload;
determining a maximum power level in power-consumption profile;
reading a power level from the ordered power-consumption profile based on the ordered unit-rate index set;
computing an increment based on a minimum of the error and a difference between the maximum power level and the power level from the ordered power-consumption profile;
summing the power level from the ordered power-consumption profile and the increment to obtain an updated power level for the minimum power-consumption profile; and
subtracting the maximum power level from the power-consumption profile.

7. A method of reducing power consumption of data center comprising:
determining an optimum power-consumption profile based on a power-consumption profile of a virtual machine over a period of time and a unit-rate profile of electrical power cost over the period of time, wherein the optimum power-consumption profile minimizes power consumption of the virtual machine by substantially aligning minima of the optimum power-consumption profile with maximum unit-rate cost of the unit-rate profile and substantially aligning maxima of the optimum power-consumption profile with minimum unit-rate cost of the unit-rate profile; and
rescheduling the virtual machine over the same period with a workload having the optimum power-consumption profile.

8. The method of claim 7 wherein the power-consumption profile represents power consumption of the virtual machine periodically scheduled over time.

9. The method of claim 7 wherein workload associated with the optimum power-consumption profile equals workload associated with the power-consumption profile.

10. The method of claim 7 wherein the optimum power-consumption profile minimizes power cost of the virtual machine execution.

11. A method of reducing power consumption of data center comprising:
determining an optimum power-consumption profile based on a power-consumption profile of a virtual machine over a period of time and a unit-rate profile of electrical power cost over the period, wherein determining the optimum power-consumption profile further comprises;
computing a total workload based on the power-consumption profile;
ordering the unit-rate profile to generate an order unit-rate profile;
forming an ordered unit-rate index set from indices of the ordered unit-rate profile;
initializing a minimum power-consumption profile based on a minimum power level of the power-consumption profile;
ordering power levels of the power-consumption profile from smallest to largest in an ordered power-consumption profile; and
iteratively updating power levels of the minimum power-consumption profile to obtain the optimum power-consumption profile based on the ordered unit-rate index set and the ordered power-consumption profile; and
rescheduling the virtual machine over the period with a workload having the optimum power-consumption profile.

12. The method of claim 11 wherein iteratively updating power levels of the minimum power-consumption profile to obtain the optimum power-consumption profile further comprises:
for each iteration,
computing a workload based on the minimum power-consumption profile;
computing an error difference between the total workload and the workload;
determining a maximum power level in power-consumption profile;
reading a power level from the ordered power-consumption profile based on the ordered unit-rate index set;
computing an increment based on a minimum of the error and a difference between the maximum power level and the power level from the ordered power-consumption profile;
summing the power level from the ordered power-consumption profile and the increment to obtain an updated power level for the minimum power-consumption profile; and
subtracting the maximum power level from the power-consumption profile.

13. A non-transitory computer-readable medium encoded with machine-readable instructions that implement a method carried out by one or more processors of a computer system to perform the operations of:
determining an optimum power-consumption profile based on a power-consumption profile of a virtual machine over a period of time and a unit-rate profile of electrical power cost over the period of time, wherein the optimum power-consumption profile minimizes power consumption of the virtual machine by substantially aligning minima of the optimum power-consumption profile with maximum unit-rate cost of the unit-rate profile and substantially aligning maxima of the optimum power-consumption profile with minimum unit-rate cost of the unit-rate profile; and
rescheduling the virtual machine over the same period with a workload having the optimum power-consumption profile.

14. The medium of claim 13 wherein the power-consumption profile represents power consumption of the virtual machine periodically scheduled over time.

15. The medium of claim 13 wherein workload associated with the optimum power-consumption profile equals workload associated with the power-consumption profile.

16. The medium of claim 13 wherein the optimum power-consumption profile minimizes power cost of the virtual machine execution.

17. A non-transitory computer-readable medium encoded with machine-readable instructions that implement a method carried out by one or more processors of a computer system to perform the operations of:

determining an optimum power-consumption profile based on a power-consumption profile of a virtual machine over a period of time and a unit-rate profile of electrical power cost over the period, wherein determining the optimum power-consumption profile further comprises;
    computing a total workload based on the power-consumption profile;
    ordering the unit-rate profile to generate an order unit-rate profile;
    forming an ordered unit-rate index set from indices of the ordered unit-rate profile;
    initializing a minimum power-consumption profile based on a minimum power level of the power-consumption profile;
    ordering power levels of the power-consumption profile from smallest to largest in an ordered power-consumption profile; and
    iteratively updating power levels of the minimum power-consumption profile to obtain the optimum power-consumption profile based on the ordered unit-rate index set and the ordered power-consumption profile; and
rescheduling the virtual machine over the period with a workload having the optimum power-consumption profile.

18. The medium of claim 17 wherein iteratively updating power levels of the minimum power-consumption profile to obtain the optimum power-consumption profile further comprises:
    for each iteration,
        computing a workload based on the minimum power-consumption profile;
        computing an error difference between the total workload and the workload;
        determining a maximum power level in power-consumption profile;
        reading a power level from the ordered power-consumption profile based on the ordered unit-rate index set;
        computing an increment based on a minimum of the error and a difference between the maximum power level and the power level from the ordered power-consumption profile;
        summing the power level from the ordered power-consumption profile and the increment to obtain an updated power level for the minimum power-consumption profile; and
        subtracting the maximum power level from the power-consumption profile.

* * * * *